(12) United States Patent
Iben et al.

(10) Patent No.: US 10,964,350 B2
(45) Date of Patent: Mar. 30, 2021

(54) SETTING BIAS CURRENTS AND LIMITING CORROSION IN TMR SENSORS

(71) Applicant: International Business Machines Corporation, Armonk, NY (US)

(72) Inventors: Icko E. T. Iben, Santa Clara, CA (US); Lee Curtis Randall, Tucson, AZ (US); Wlodzimierz Stanley Czarnecki, Palo Alto, CA (US); Jason Liang, Campbell, CA (US); Ernest Stewart Gale, Tucson, AZ (US); David Lee Swanson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/506,880

(22) Filed: Jul. 9, 2019

(65) Prior Publication Data
US 2021/0012806 A1  Jan. 14, 2021

(51) Int. Cl.
G11B 20/18 (2006.01)
G11B 5/39 (2006.01)

(52) U.S. Cl.
CPC ........ G11B 20/1816 (2013.01); G11B 5/3909 (2013.01)

(58) Field of Classification Search
CPC .......................... G11B 20/1816; G11B 5/3909
See application file for complete search history.

(56) References Cited

U.S. PATENT DOCUMENTS

| | | |
|---|---|---|
| 6,600,638 B2 | 7/2003 | Gill |
| 7,656,602 B2 | 2/2010 | Iben et al. |

(Continued)

FOREIGN PATENT DOCUMENTS

| | | |
|---|---|---|
| EP | 1134743 A2 | 9/2001 |
| EP | 2363722 A1 | 9/2011 |

OTHER PUBLICATIONS

Deak, J., "Practical Tunneling Magnetoresistive Z-Axis Sensors," AMA Conferences, 2015, pp. 245-250.

(Continued)

*Primary Examiner* — Kyle Vallecillo
(74) *Attorney, Agent, or Firm* — Zilka-Kotab, P.C.

(57) ABSTRACT

A method includes determining whether a tunneling magnetoresistance (TMR) sensor is corroded using resistance, amplitude and signal to noise ratio (SNR) measurements of the sensor. A method to determine whether a TMR sensor is corroded includes determining an expected initial resistance value, $R_{TMRoUse}$ and measuring a resistance value, $R_{TMR}$, of the sensor. The method includes calculating a ratio of the $R_{TMR}$ value and the expected initial resistance value, $R_{TMRoUse}$ and determining whether the ratio is in a predefined range for the TMR sensor. In response to determining that the ratio of the sensor is within the predefined range, the method includes outputting an indication that the TMR sensor is corroded. In response to determining that the ratio of the sensor is outside the predefined range, the method includes outputting an indication that the TMR sensor is not corroded.

18 Claims, 26 Drawing Sheets

(56) References Cited

U.S. PATENT DOCUMENTS

| | | |
|---|---|---|
| 8,743,511 B2 | 6/2014 | Childress et al. |
| 9,251,810 B2 | 2/2016 | Iben |
| 9,620,154 B1 | 4/2017 | Iben |
| 9,658,784 B1* | 5/2017 | Ahmad .............. G11B 5/00813 |
| 9,678,145 B2 | 6/2017 | Iben |
| 9,685,201 B2 | 6/2017 | Iben et al. |
| 10,311,902 B2 | 6/2019 | Aria et al. |
| 2006/0279882 A1 | 12/2006 | Honda et al. |
| 2009/0273857 A1* | 11/2009 | Iben .................. G11B 5/40 360/97.12 |
| 2009/0322319 A1* | 12/2009 | Kreupl ................ G01R 33/098 324/207.21 |
| 2011/0141606 A1* | 6/2011 | Nishioka ................ H01L 43/12 360/71 |
| 2016/0093320 A1 | 3/2016 | Aria et al. |
| 2017/0011777 A1* | 1/2017 | Iben .................... G11B 33/1406 |
| 2017/0125040 A1 | 5/2017 | Ahmad et al. |
| 2017/0284966 A1 | 10/2017 | Kosel et al. |
| 2017/0330588 A1* | 11/2017 | Biskeborn .......... G11B 5/00813 |
| 2017/0370984 A1 | 12/2017 | Biskeborn et al. |

OTHER PUBLICATIONS

Jander, et al., "Magnetoresistive Sensors for Nondestructive Evaluation," 10th SPIE International Symposium, Nondestructive Evaluation for Health Monitoring and Diagnostics, Conference 5770, 2005, 13 pages.

Biskeborn et al., "Head and Interface for High Areal Density Tape Recording," IEEE Transactions on Magnetics, vol. 48, No. 11, Nov. 2012, pp. 4463-4466.

Eric et al., "Dielectric Breakdown of TMR Sensors and the Role of Joule Heating," 38th Electrical Overstress/Electrostatic Discharge Symposium (EOS/ESD), 2016, 9 pages, retrieved from https://ieeexplore.ieee.org/document/7592529.

Iben et al., U.S. Appl. No. 16/436,462, filed Jun. 10, 2019.

* cited by examiner

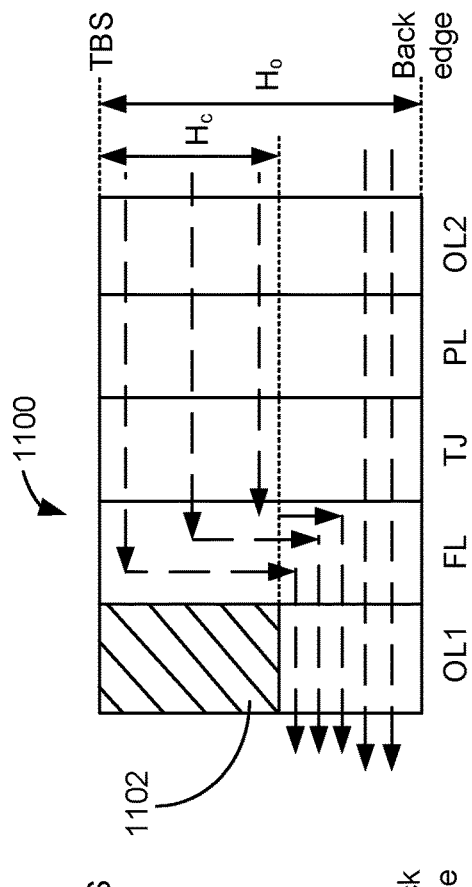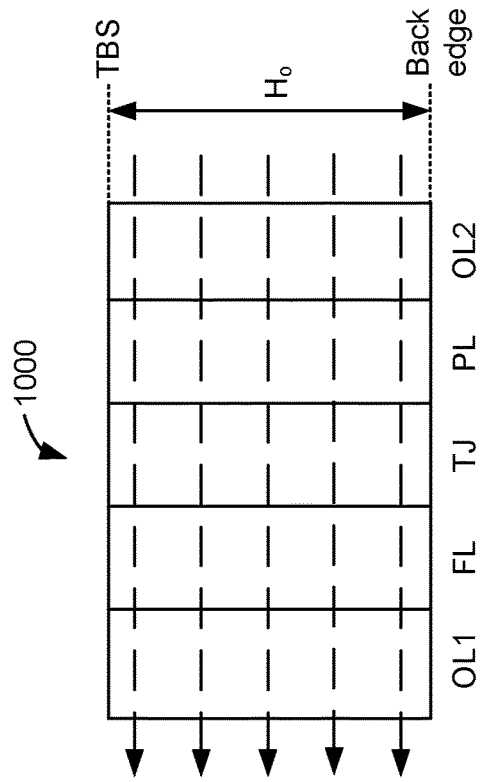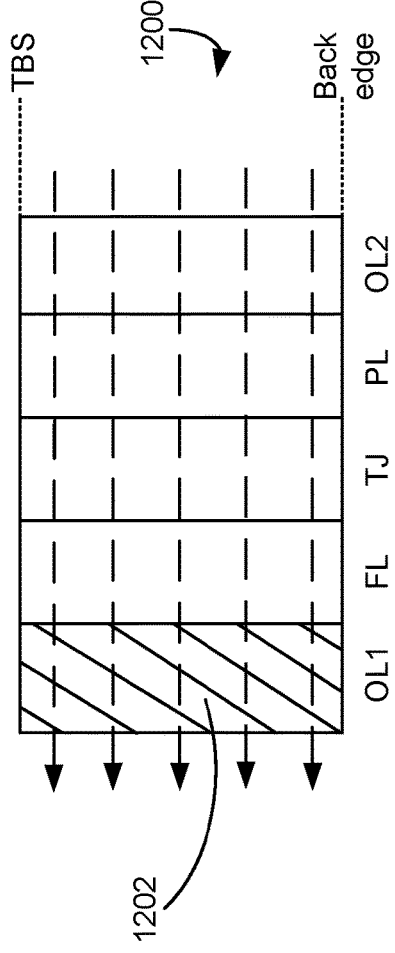

| Track # | $R_{TMR0}$ Ω | $R_{TMR}$ Ω | $\Delta R_{TMR}$ % | $R_{TMR}/R_{TMR0}$ | $\Delta SNR_{Data}$ dB | $\Delta SNR_{Cal}$ dB | $\Delta SNR_{Data} - \Delta SNR_{Cal}$ dB |
|---|---|---|---|---|---|---|---|
| R31 | 66 | 105 | 59 | 1.59 | -1.9 | -2.0 | 0.1 |
| R33 | 66 | 121 | 83 | 1.83 | -7.2 | -2.6 | -4.6 |
| R20 | 66 | 128 | 94 | 1.94 | -4.0 | -2.9 | -1.1 |
| R29 | 66 | 128 | 94 | 1.94 | -6.0 | -2.9 | -3.1 |
| R26 | 66 | 147 | 123 | 2.23 | -4.0 | -3.5 | -0.5 |
| R23 | 111 | 293 | 164 | 2.64 | -4.2 | -4.2 | 0.0 |
| R27 | 66 | 261 | 296 | 3.95 | -7.5 | -6.0 | 1.5 |

FIG. 20

| | Sample | $R_{TMRo}$ ($\Omega$) | $R_{TMRc}$ ($\Omega$) | $I_{bias}$ (mA) | $V_{bias}$ (mV) | $V_{sig}$ ($\mu V$) | $V_{sig}/V_{mr}$ ($\mu V/\mu V$) | $(V_{sig}/V_{mr})_{Norm}$ (%) | $R_{TMRo}/R_{TMRc}$ (%) |
|---|---|---|---|---|---|---|---|---|---|
| Virgin | TMR1 | 115 | 125 | 0.5 | 63 | 3552 | 57 | 100 | 100 |
| Corroded 1 | TMR2 | 115 | 490 | 0.2 | 98 | 1850 | 19 | 33 | 26 |
| Corroded 2 | TMR3 | 115 | 424 | 0.2 | 85 | 6969 | 82 | 144 | 29 |
| Corroded 3 | TMR4 | 0.6 | 95.6 | 0.5 | 48 | 1989 | 42 | 70 | 63 |
| Corroded 4 | TMR5 | 80.0 | 123.3 | 0.5 | 62 | 1972 | 32 | 32 | 65 |
| Corroded 5 | TMR6 | 93.9 | 134.1 | 0.5 | 67 | 2199 | 33 | 83 | 70 |

FIG. 22

SETTING BIAS CURRENTS AND LIMITING CORROSION IN TMR SENSORS

BACKGROUND

The present invention relates to data storage systems, and more particularly, this invention relates to damaged tunneling magnetoresistance (TMR) sensors.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability.

TMR sensors are used to read magnetic data written on storage media such as hard disks, high definition (HD) media, tape media, etc. TMR sensors comprise two ferromagnetic layers separated by a thin oxide tunnel barrier (e.g., MgO, AlO, etc.). The polarization direction of one of the ferromagnetic layers is "pinned" to a particular direction while the polarization direction of the other ferromagnetic layer (e.g., the free layer) is free to align with the polarization direction of magnetic storage media over which the TMR sensor is passed. When the polarization directions of the free layer and the pinned layer are parallel, the electrical resistance across the TMR sensor is low because the electrons tunnel through the tunnel barrier. When the polarization of the free layer and the pinned layer are anti-parallel, the electrical resistance across the TMR sensor is high because electrons may not tunnel through the tunnel barrier. TMR sensors read bits stored on magnetic storage media by measuring changes in resistance across the TMR sensor due to the magnetic fields generated by the bit transitions as the sensor passes over those bits.

TMR sensors may be damaged by scratches, dielectric breakdown from electrical overstress (EOS), dielectric breakdown from electrical discharge (ESD), pin-holes, lapping smears resulting in degraded and/or abnormal amplitude response in the TMR sensors, etc. Damage to a TMR sensor may be difficult to detect. Damage may be detected using magnetic tests which detect degraded and/or abnormal magnetoresistance (MR) response from a magnetic field. Subjecting TMR sensors to magnetic fields in the manufacturing line is not practical.

TMR sensors are sensitive to corrosion. Resistance increases when TMR sensors are corroded. The corrosion is deleterious to the function of the TMR sensor. Corrosion in the sensors may also add undesired noise. To avoid dielectric breakdown due to corrosion, TMRs are conventionally biased with a limit on the voltage across the tunnel junction.

SUMMARY

A method, according to one embodiment, includes determining whether a tunneling magnetoresistance (TMR) sensor is corroded using resistance, amplitude and signal to noise ratio (SNR) measurements of the sensor.

A computer program product to select a bias current in a corroded TMR, according to one embodiment, includes a computer readable storage medium having program instructions embodied therewith. The program instructions are executable by a computer to cause the computer to perform the foregoing method.

A method to determine whether a TMR sensor is corroded, according to one embodiment, includes determining an expected initial resistance value, $R_{TMRoUse}$, and measuring a resistance value, $R_{TMR}$, of the sensor. The method includes calculating a ratio of the $R_{TMR}$ value and the expected initial resistance value, $R_{TMRoUse}$, and determining whether the ratio is in a predefined range for the TMR sensor. In response to determining that the ratio of the sensor is within the predefined range, the method includes outputting an indication that the TMR sensor is corroded. In response to determining that the ratio of the sensor is outside the predefined range, the method includes outputting an indication that the TMR sensor is not corroded.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 10 is an exemplary cross section of a TMR sensor, in accordance with one embodiment of the present invention.

FIG. 11 is an exemplary cross section of a TMR sensor comprising a partially corroded removed layer, in accordance with one embodiment of the present invention.

FIG. 12 is an exemplary cross section of a TMR sensor comprising a corroded removed layer, in accordance with one embodiment of the present invention.

FIG. 20 is a table of the data plotted in FIG. 19, in accordance with one embodiment of the present invention.

FIG. 22 is a table of the data plotted in FIGS. 21A and 21B, in accordance with one embodiment of the present invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of magnetic storage systems, as well as operation and/or component parts thereof.

In one general embodiment, a method includes determining whether a tunneling magnetoresistance (TMR) sensor is corroded using resistance, amplitude and signal to noise ratio (SNR) measurements of the sensor.

In another general embodiment, a computer program product to select a bias current in a corroded TMR includes a computer readable storage medium having program instructions embodied therewith. The program instructions are executable by a computer to cause the computer to perform the foregoing method.

In another general embodiment, a method to determine whether a TMR sensor is corroded includes determining an expected initial resistance value, $R_{TMRoUse}$ and measuring a resistance value, $R_{TMR}$, of the sensor. The method includes calculating a ratio of the $R_{TMR}$ value and the expected initial resistance value, $R_{TMRoUse}$ and determining whether the ratio is in a predefined range for the TMR sensor. In response to determining that the ratio of the sensor is within the predefined range, the method includes outputting an indication that the TMR sensor is corroded. In response to determining that the ratio of the sensor is outside the predefined range, the method includes outputting an indication that the TMR sensor is not corroded.

Figure 1A:
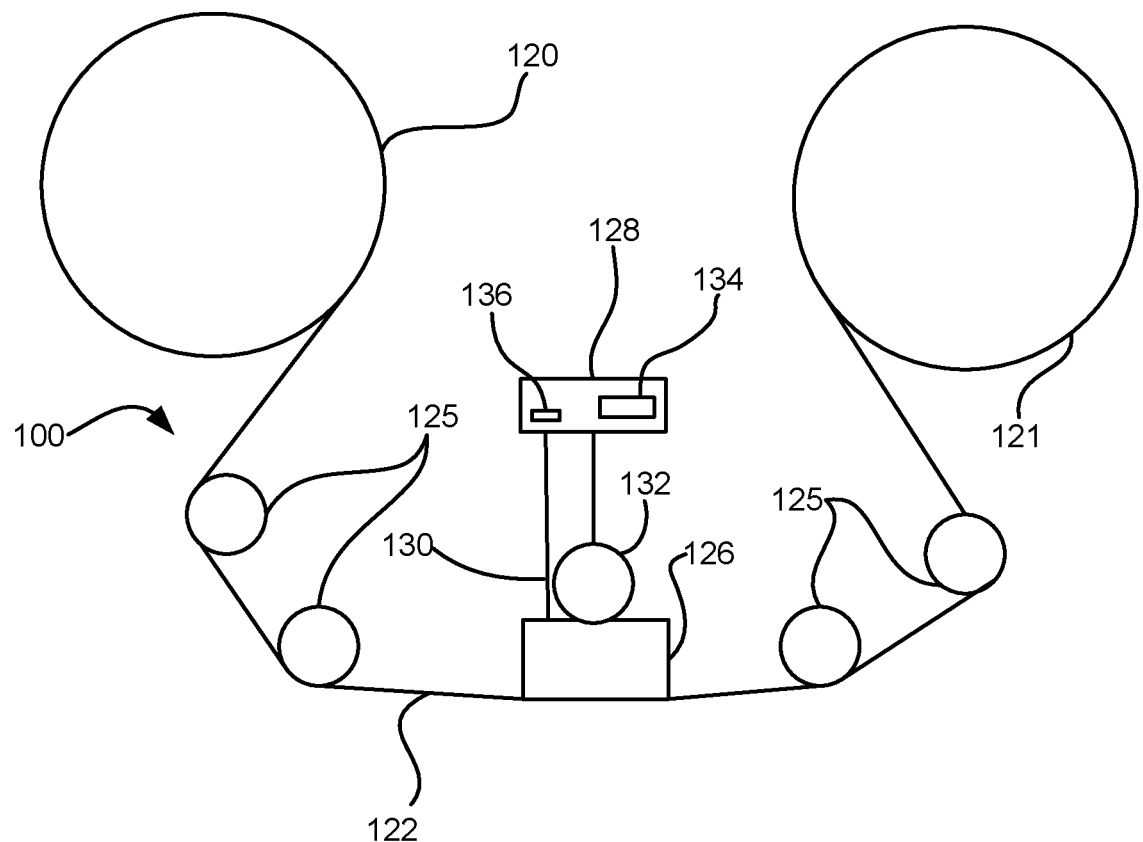
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, as will be understood by those of skill in the art.

Figure 1B:
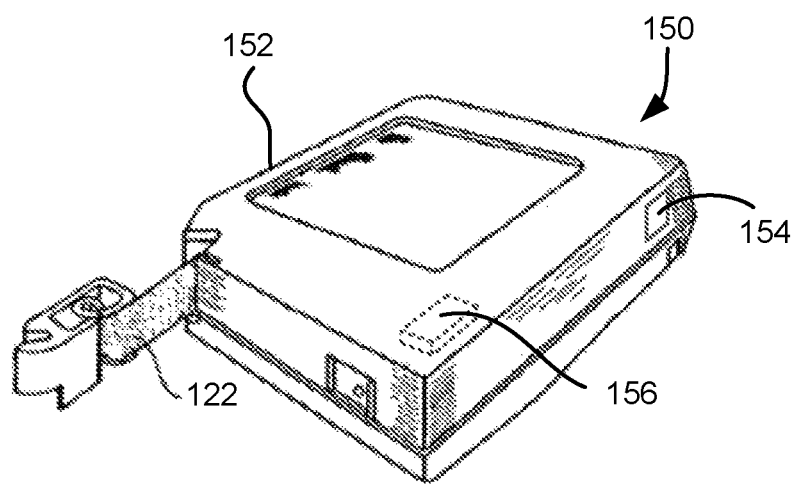
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
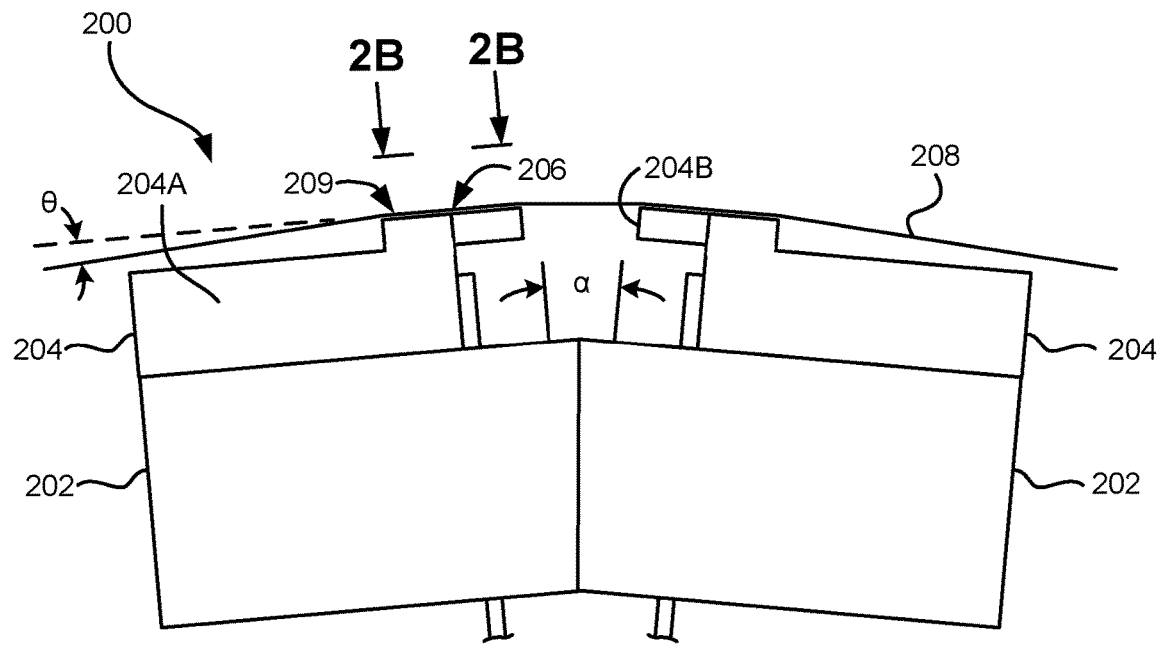
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
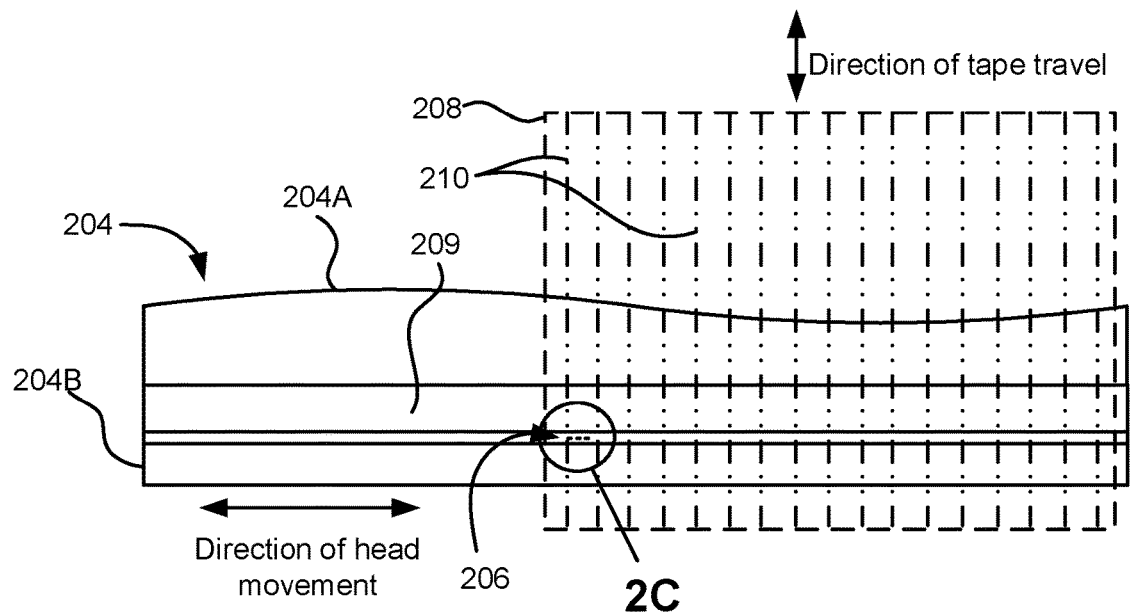
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
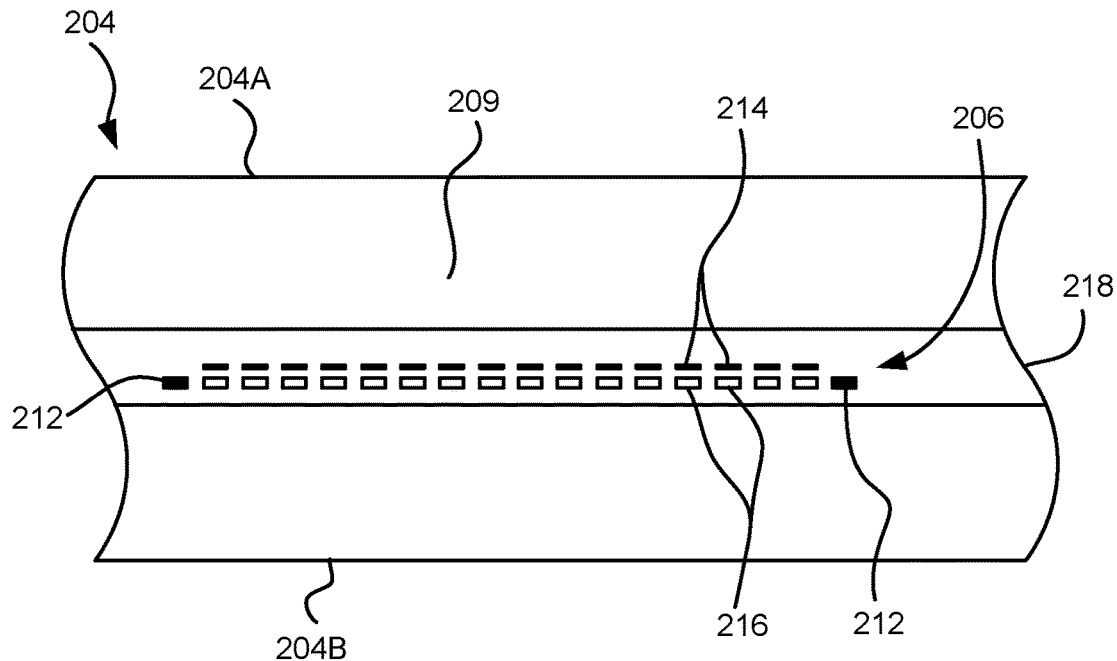
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
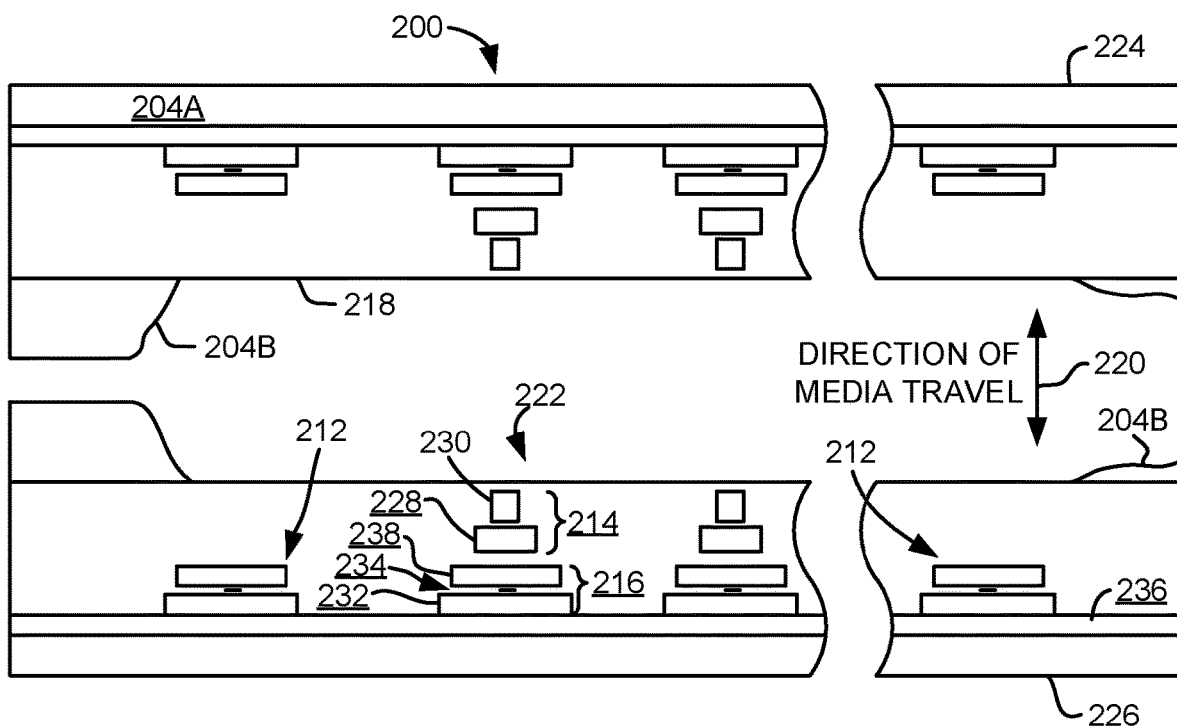
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative insulating layer 236. The writers 214 and the readers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe(-), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer poles 228, 230, and a coil (not shown). The sensor may be of any known type, including those based on magnetoresistive (MR), GMR, AMR, tunneling magnetoresistance (TMR), etc. The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
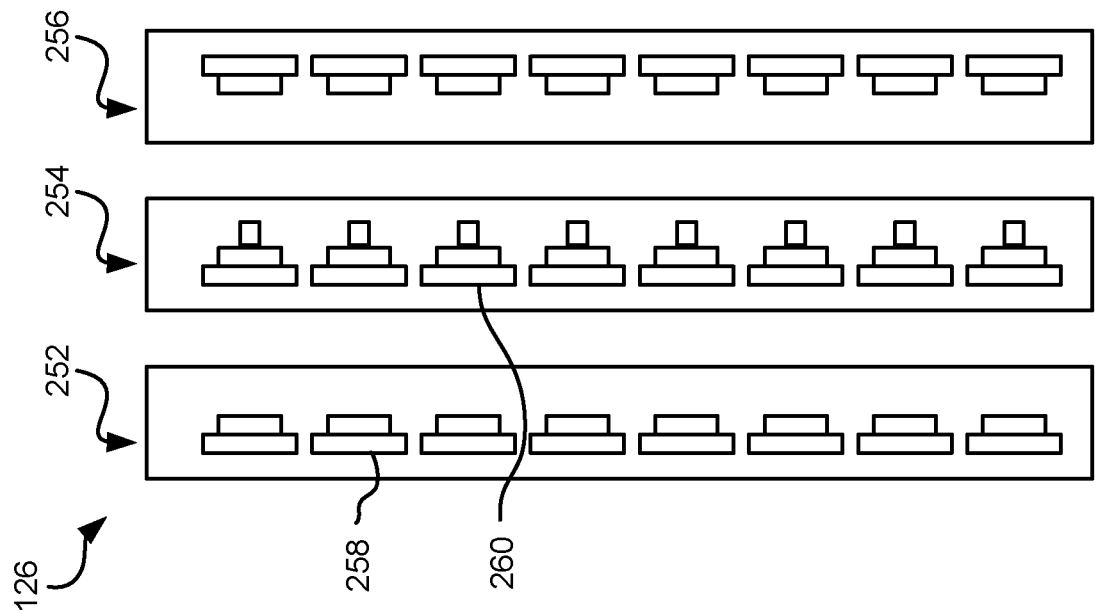
FIG. 4 is a partial tape bearing surface view of a magnetic head having a read-write-read configuration.
Figure 3:
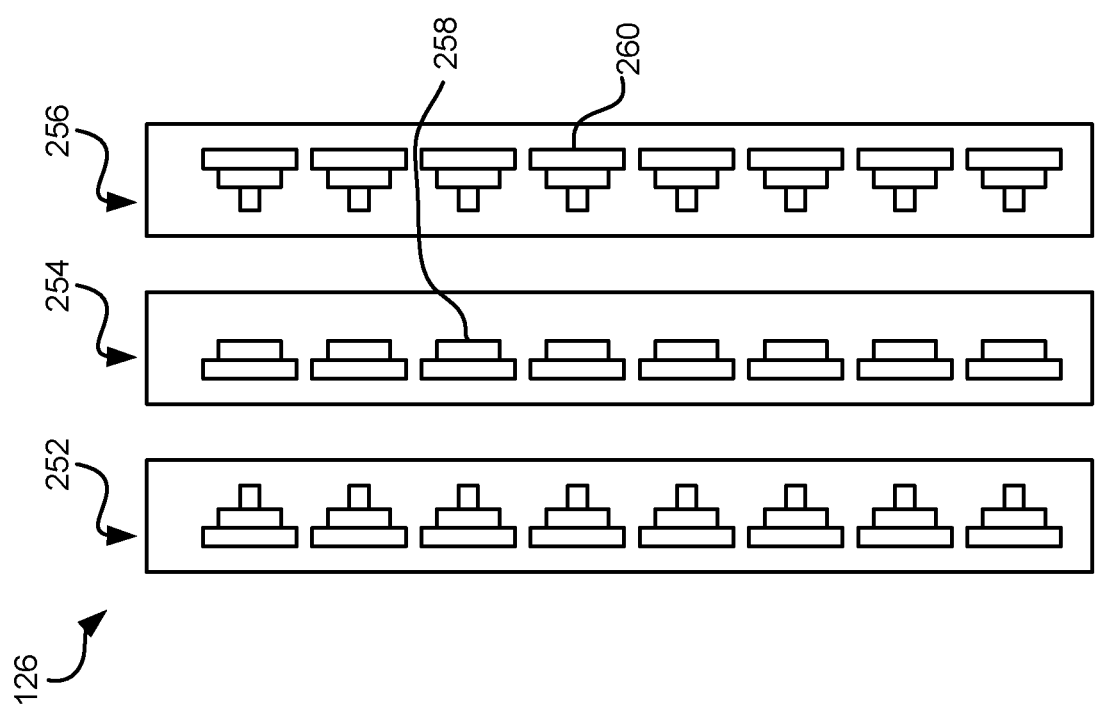
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
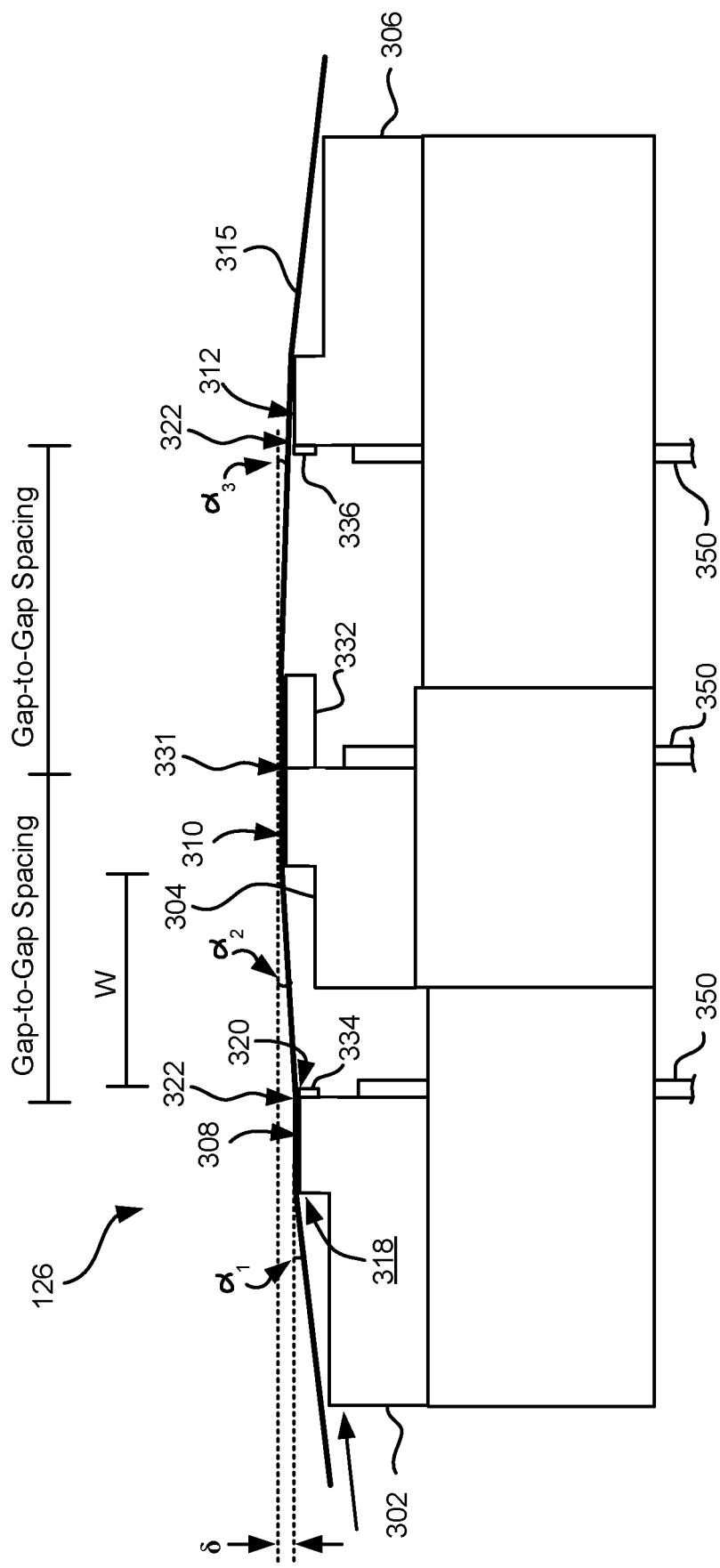
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
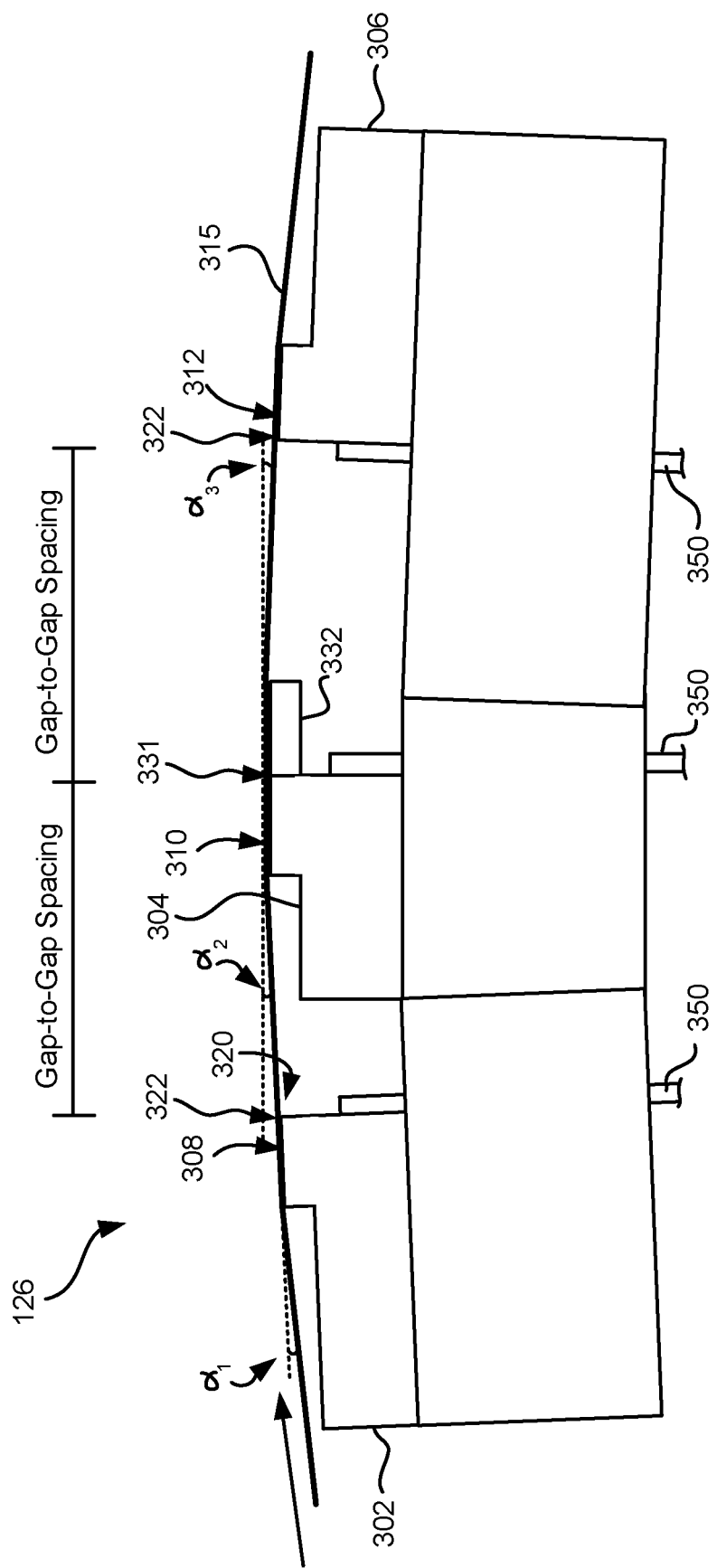
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
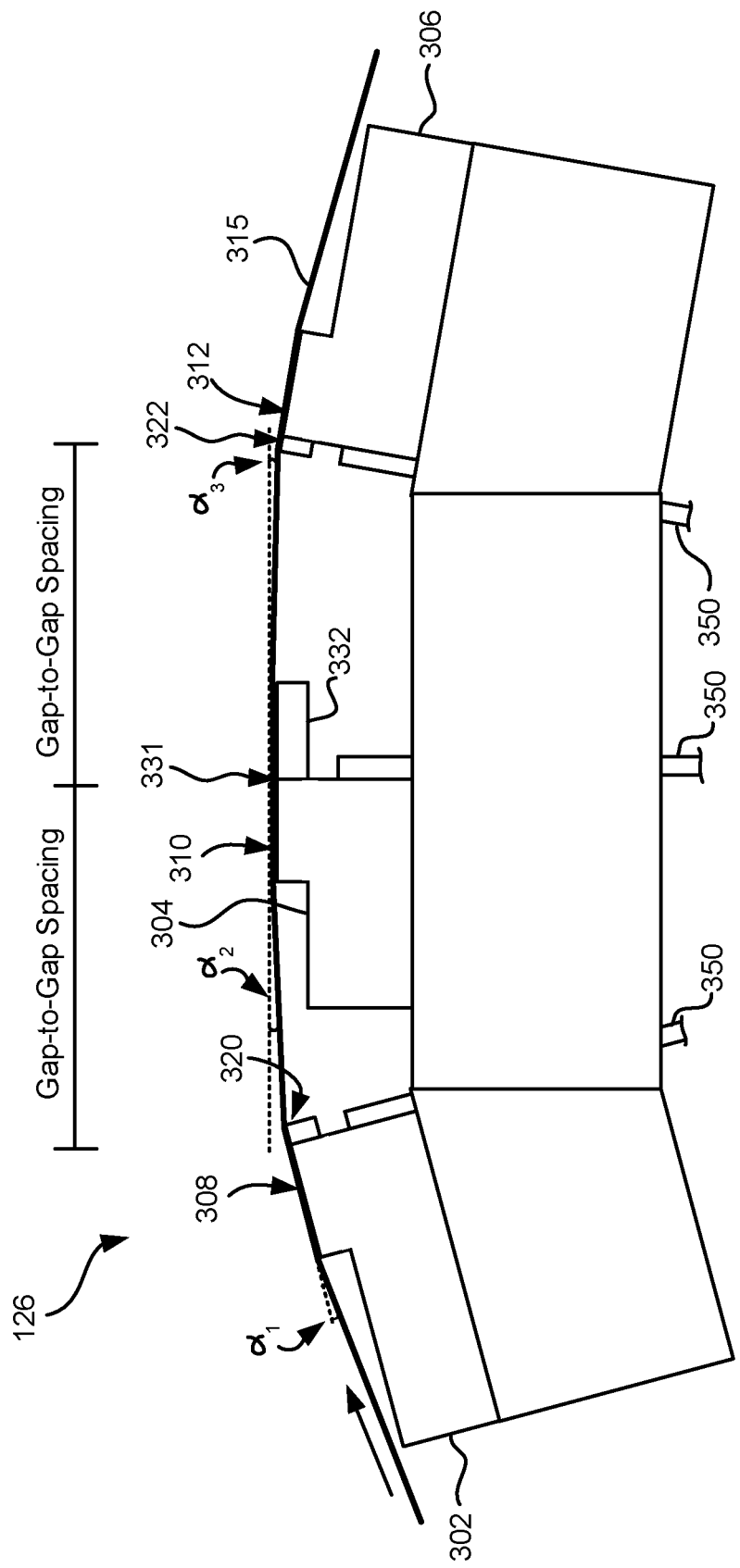
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
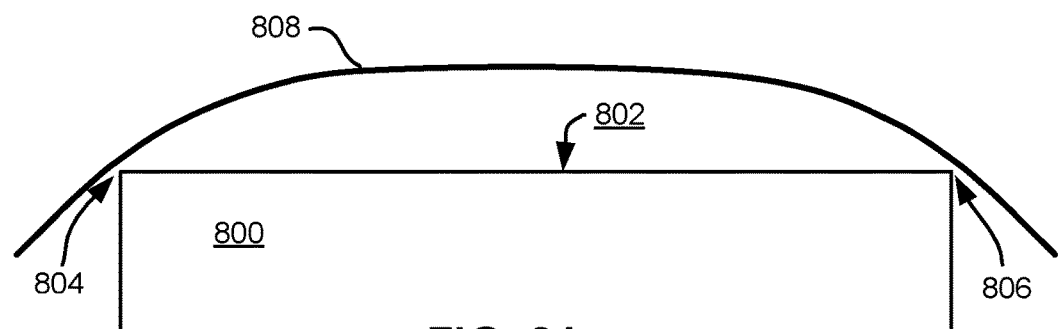
FIGS. 8A-8C are schematics depicting the principles of tape tenting.
Figure 8B:
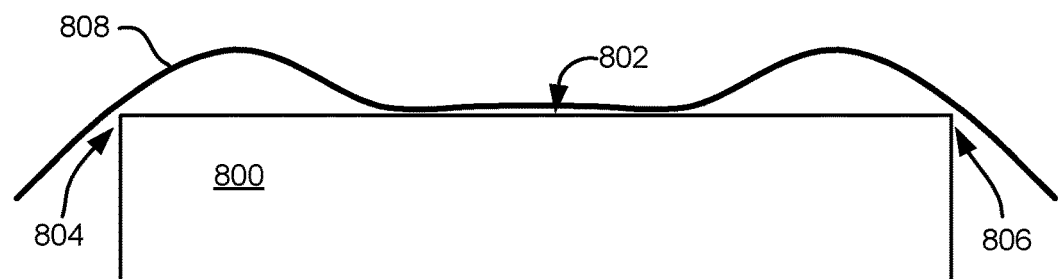
Figure 8C:
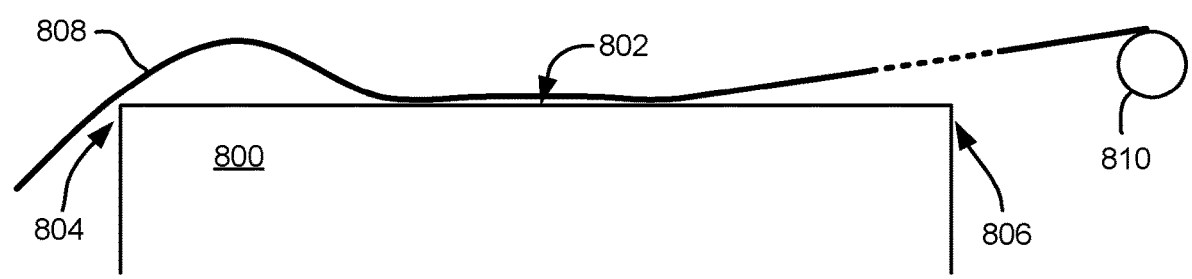

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
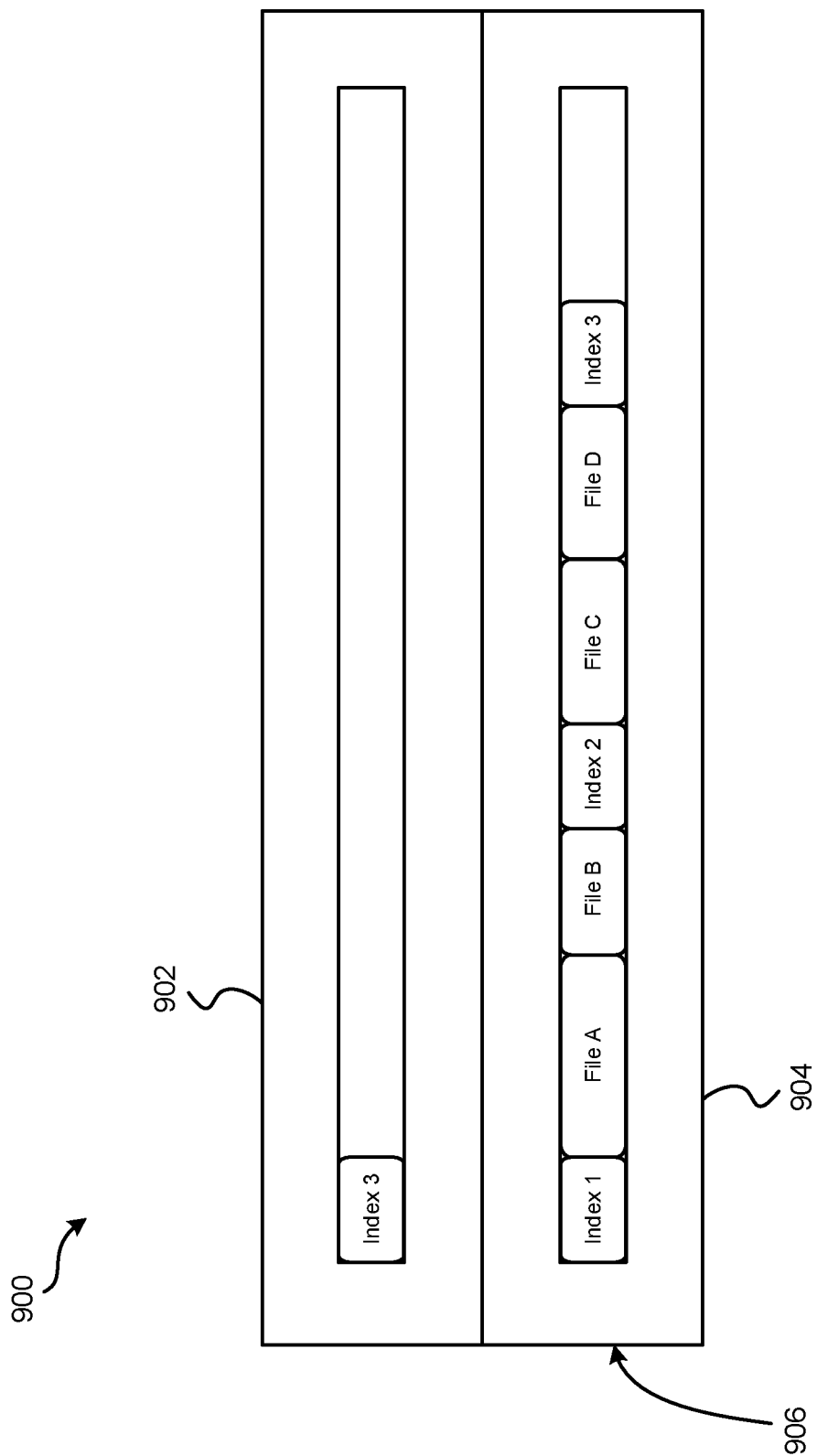
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

TMR sensors are sensitive to corrosion and damage. TMR sensors may be damaged by scratches, dielectric breakdown from electrical overstress (EOS), dielectric breakdown from electrical discharge (ESD), pin-holes, lapping smears resulting in degraded and/or abnormal amplitude response, etc. TMR sensors comprise materials which are subject to corrosion via oxidation and/or tarnish. The metallic layers comprising the sensors may be exposed to air, humidity, and/or any other contaminants present in the air. Oxidation and corrosion may introduce noise into the signal. Oxidation and corrosion of the sensors may cause significant degradation of the sensor performance and reliability.

A device may comprise an array of TMR sensors which do not corrode simultaneously. The corrosion of TMRs in an array may be a distribution of corrosion times and corrosion levels. TMR sensors are often not damaged beyond use immediately. TMR sensors function with some amount of corrosion for a period of time, but it would be beneficial to respond to the corrosion and limit further corrosion.

The corrosion is deleterious to the function of the TMR. Corrosion in the sensor, for example, may add undesired noise. To avoid dielectric breakdown, TMRs are conventionally biased with a limit on the voltage across the tunnel junction.

TMR sensors may operate over a wide range of bias voltages. Due to variabilities in processing, some sensors may experience more noise at various bias voltages and some sensors may function well at other ranges within the range of bias voltages specified for the product. In order to achieve a high yield of parts in production, a range of bias voltages is conventionally allowed.

Application of bias currents results in Joule heating of the TMR sensor, which may protect the TMR sensor from corrosion in a humid environment. Generally, the higher the bias voltage, the higher the protection. A lower limit for the bias voltage may be applied to provide sufficient protection to all the sensors from corrosion. The yields for a large volume of parts may be decreased by excessively limiting the bias voltages. Corrosion events are relatively rare events compared to the substantial decrease in yields experienced by parts with low bias voltages.

A bias voltage, $V_{bias}$, may be conventionally set using the resistance of the TMR, $R_{TMR}$, and a bias current, $I_{bias}$, based on the measured resistance. For example, $$I_{bias} = V_{bias}/R_{TMR} \tag{1}$$

Voltage limits are set for TMR sensors because the failure mechanism for TMR sensors is dielectric breakdown above a given voltage. The output may be proportional to the voltage across the tunnel junction.

In the storage industry, the resistance of the TMR devices may vary by levels of the order of 2 or more. For constant current biasing, some sensors may be under-biased with lower amplitudes and other sensors may be over-biased with a high risk of dielectric breakdown failure.

Various embodiments of the present invention provide operations to safely bias one or more partially corroded TMR sensors in order to limit corrosion.

FIG. 10 is an exemplary cross section 1000 of a TMR sensor comprising a free layer (FL), a tunnel junction (TJ), a pinned layer (PL), and other layers (OL1, OL2, etc.). The exemplary cross section 1000 illustrates an uncorroded TMR sensor where current may flow through all layers and the resistance is predominantly across the TJ.

In various approaches, the following equations may be used.

$$R_{TMRo} = \frac{RA}{\text{Area}_{TJo}} \tag{2a}$$

$$\text{Area}_{TJo} = W \cdot H \tag{2b}$$

where RA is equal to the resistance, $R_{TMRo}$, times the area product, $\text{Area}_{TJo}$, for the TJ. W is the track width and H is the stripe height, $H_o$. In some approaches, the track width is the dimension parallel to the tape bearing surface (TBS) and H is the dimension perpendicular to the TBS. In one approach, any additional lead and/or cable resistance is assumed to be known and subtracted from the resistance.

FIG. 11 is an exemplary cross section 1100 of a TMR sensor comprising a free layer (FL), a tunnel junction (TJ), a pinned layer (PL), and other layers (OL1, OL2, etc.), and a partially corroded removed layer 1102. In various approaches, a partially corroded removed layer 1102 is a layer removed at least one layer from the TMR junction of the sensor. In the figure, the width of the TMR sensor is W and the stripe height is $H_o$ (or H). In the case of a partially corroded removed layer 1102, the corrosion depth from the tape bearing surface (TBS) is $H_c$ toward the back edge of the TMR sensor. As shown in FIG. 11, $H_c$ is less than $H_o$ and $H_c$ does not reach the back edge of the TMR sensor. The width of the corroded layer, $W_c$, may not be across the full width, W, of the sensor such that the current passes around the corroded layer. In one approach, the current may flow along the layers adjacent to the TJ, FL, and PL. In this approach, the TMR functions as would be expected by one having ordinary skill in the art with a partial drop in voltage across the TJ in the region between the TBS and $H_c$. The TMR resistance and amplitude are not changed significantly from the TMR resistance and amplitude in the exemplary cross section 1000 shown above.

FIG. 12 is an exemplary cross section 1200 of a TMR sensor comprising a free layer (FL), a tunnel junction (TJ), a pinned layer (PL), and other layers (OL1, OL2, etc.), and a corroded removed layer 1202. The corroded removed layer 1202 may be fully corroded from the TBS to the back edge of the TMR sensor, e.g., $H_c=H_o$. In various approaches, a corroded removed layer 1202 is a layer removed at least one layer from the TMR junction of the sensor.

In one approach, for a corroded removed layer, any increase in resistance is in series with the TMR sensor as shown in FIG. 12. Until the area of the corroded removed layer (e.g., $Area_c=W_c \cdot H_c$) approaches the full initial area of the TMR (e.g., $Area_{TJo}=W \cdot H$), the resistance of the TMR sensor may not change significantly. In response to the area of the corroded region in the removed layer reaching a predefined threshold, the effect on the resistance of the sensor is to add a series resistance to the total resistance of the sensor. For example, for a corroded removed layer (e.g., fully or partially corroded), the resistance is the sum of $R_{TMRo}$ and any series resistances of the corroded layer, $R_{CL}$:

$$R_{TMRc} = R_{TMRo} + R_{CL} \quad (3)$$

In another approach, $R_{TMRc}$ may be used to set the bias current:

$$I_{bias} = \frac{V_{bias}}{R_{TMRc}} \quad (4a)$$

The TMR sensor, $V_{sig}$, is degraded from the uncorroded sensor value, $V_{sigo}$, and the fractional amplitude, $f_{AMP}$, is given by:

$$f_{AMP} = \frac{V_{sig}}{V_{sigo}} = \left(\frac{R_{TMRo}}{R_{TMRc}}\right) = \left[\frac{R_{TMRo}}{R_{CL}+R_{TMRo}}\right] \quad (4b)$$

The fractional drop in signal is proportional to the fractional increase in the resistance. The signal may be recovered using the initial TMR resistance to set the bias current:

$$I_{bias} = V_{bias}/R_{TMRo} \quad (5)$$

If the amplitude is large enough, such that the signal-to-noise ratio (SNR) of the sensor is media noise limited, the SNR may not be affected by corrosion in a removed layer.

In another approach, the expected initial expected resistance may not be the resistance first measured in the drive. The TMR may comprise a shorting resistance in parallel with the TJ initially.

Figure 13:
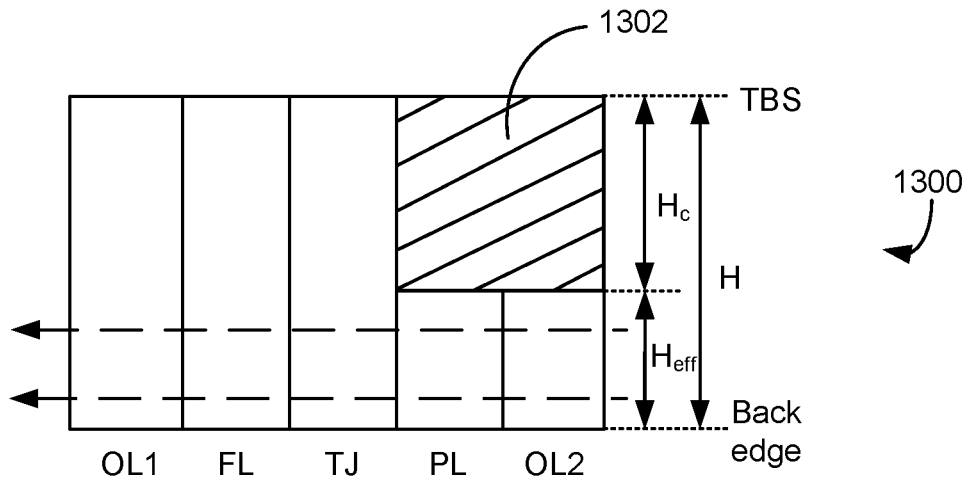
FIG. 13 is an exemplary cross section of a TMR sensor comprising a corroded adjacent layer, in accordance with one embodiment of the present invention.

FIG. 13 is an exemplary cross section 1300 of a TMR sensor comprising a free layer (FL), a tunnel junction (TJ), a pinned layer (PL), and other layers (OL1, OL2, etc.), and a corroded adjacent layer 1302. The corroded adjacent layer 1302 comprises corrosion across the PL and OL2 layers a distance $H_c$ from the TBS toward the back edge. Distance $H_{eff}$, e.g., $H_{eff}=H-H_c$, is not corroded.

Figure 14:
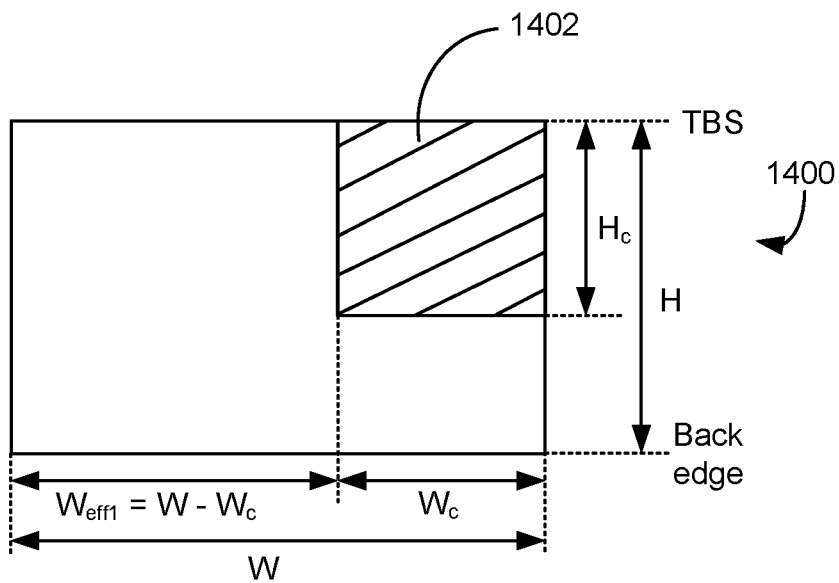
FIG. 14 is an exemplary cross section of a TMR sensor comprising a corroded adjacent layer, in accordance with one embodiment of the present invention.

FIG. 14 is an exemplary cross section 1400 of a TMR sensor comprising a partially corroded layer 1402. The partially corroded layer 1402 comprises corrosion across a depth of $H_c$ toward the back edge. The partially corroded layer 1402 comprises corrosion across a width $W_c$. $W_c$ may be less than or equal to the entire track width, W. The effective functional area of the TMR sensor, $Area_{TJ-eff}$, may be given by the difference in the initial area, $Area_{TJo}$, and the corroded area, $Area_c$:

$$Area_{TJ-eff} = Area_{TJo} - Area_c = -W_c \cdot H_c \quad (6)$$

and the resistance of the TMR sensor may be given by Equation (2a) with $Area_{TJo}$ being replaced by $Area_{TJ-eff}$ of Equation (6).

In one approach, the voltage and electric fields across the TMR junction are defined by V and E respectively, the thickness of the TMR junction is defined by d, the effective conductivity of the tunnel junction is defined by $\sigma_o$, and the fractional change in conductivity of the TMR sensor versus the magnetic field may be defined by $f_{mr}$. The magnetic field strength at the surface of the TMR for the stripe heights which are short enough such that the B field penetrates linearly into the TMR at current, $I_{TJ}$, through the tunnel junction, is given by:

$$I_{TJ} = E \cdot \sigma_o \cdot [H \cdot W - H_c \cdot W_c] + \quad (7)$$
$$E \cdot \sigma_o \cdot f_{mr} \cdot \frac{1}{2} \cdot B_o \cdot H \cdot \left[(W-W_c) + W_c \cdot \left(1 - \frac{H_c}{H}\right)^2\right].$$

The resistance, R, is $V/I_{TJ}$, and given by:

$$R = \frac{V}{I_{TJ}} = RA_o \cdot \left[[W \cdot H - H_c \cdot W_c] + \quad (8) \right.$$
$$\left. \frac{1}{2} \cdot f_{mr} \cdot B_o \cdot H \cdot W \cdot \left[1 - \frac{W_c}{W} \cdot \left[1 - \left(1 - \frac{H_c}{H}\right)^2\right]\right]\right]^{-1}$$

where $RA_o$ is the resistance-area product of a good (e.g., undamaged) TMR sensor:

$$RA_o = \left(\frac{d}{\sigma_o}\right). \quad (9)$$

In the small signal case, e.g., $f_{mr} \cdot B_o \ll 1$, $$R \sim \frac{V}{I_{TJ}} \sim R_{TMRc} + \Delta R_{sig}, \quad (10a)$$

where the DC resistance is given by:

$$R_{TMRc} = \frac{RA_o}{[W \cdot H - H_c \cdot W_c]} = \frac{R_{TMRo}}{\left[1 - \frac{H_c \cdot W_c}{W \cdot H}\right]}, \quad (10b)$$

and the AC resistance from the signal is:

$$\Delta R_{sig} = \quad (10c)$$
$$\frac{1}{2} \cdot f_{mr} \cdot B_o \cdot \frac{W \cdot H}{[W \cdot H - H_c \cdot W_c]} \cdot R_{TMRc} \cdot \left[1 - \frac{W_c}{W} \cdot \left[1 - \left(1 - \frac{H_c}{H}\right)^2\right]\right].$$

For a voltage bias sensor where the current is the bias voltage, $V_{bias}$, divided by the resistance, $R_{TMRc}$, the signal, $V_{sig}$, is:

$$f_{AMP} = \frac{V_{sig}}{V_{sigo}} = \frac{I_{bias} \cdot \Delta R_{sig}}{V_{sigo}} = \quad (11)$$

$$\frac{V}{V_{sigo}} \cdot \frac{\Delta R_{sig}}{R_{TMRc}} = \frac{W \cdot H}{[W \cdot H - H_c \cdot W_c]} \cdot \left[1 - \frac{W_c}{W} \cdot \left[1 - \left(1 - \frac{H_c}{H}\right)^2\right]\right],$$

$$\text{with } V_{sigo} = \frac{1}{2} \cdot f_{mr} \cdot B_o \cdot V_{bias}. \quad (12)$$

In one embodiment, the region of width, $W_c$, is fully corroded to the back edge of the TMR stripe wherein $H_c=H$. In this embodiment, Equation (11) reduces to $V_{sig}=V_{sigo}$ and the sensor is essentially a functional TMR with a narrower width than for the uncorroded TMR, e.g., $W-W_c$. The signal amplitude is essentially undiminished for the fixed bias voltage across the TMR and the SNR is degraded. The SNR may drop with the square-root of the width. In decibels (dB), the SNR drops as:

$$\Delta SNR = 10\log_{10}\left(\frac{W_{eff1}}{W}\right) = 10\log_{10}\left(1 - \frac{W_c}{W}\right) = 10\log_{10}\left(\frac{R_{TMRo}}{R_{TMRc}}\right). \quad (13)$$

Using Equation (11), a section of the head of width $W_c$ is corroded to a depth of $H_c$, the amplitude drops from an increasing $H_c$ to a minimum and then increases toward $H_c=H$. The fractional amplitude, $f_{AMP}$, given in Equation (4b) for corrosion at a removed layer is lower than for corrosion in an adjacent layer for the same increase in total resistance (e.g., $R_{TMRo}-R_{TMRc}$) and when the total resistance, $R_{TMRc}$, is used to calculate the bias current (e.g., Equation (5) with $R_{TMRo}$ replaced with $R_{TMRc}$). Corrosion in the adjacent layer may cause stresses in the TMR sensor which affect the TMR sensor transfer curve. The SNR may degrade more than is given in Equation (13).

Corrosion near the surface may damage the free-layer near the surface where the field does not penetrate the region below the upper-layer corrosion layer. The drop in the amplitude may be lower than calculated using Equation (11). Corrosion at the surface for an adjacent layer corrosion may also degrade the SNR.

In one embodiment, one limit includes corroding the sensor across the entire width of the sensor ($W_c=W$) and uniformly to a depth of $H_c$. The amplitude may drop. The signal may drop with a constant voltage bias, as a fractional amplitude, $f_{AMP}$, compared to the non-corroded amplitude, $V_{sigo}$:

$$f_{AMP} = \frac{V_{sig}}{V_{sigo}}\left(1 - \frac{H_c}{H}\right) = \frac{R_{TMRo}}{R_{TMRc}} = \frac{1}{(1 + \Delta R_f)} = \frac{A_{TJ-eff}}{A_{TJo}}, \quad (14a)$$

$$\text{where } \Delta R_{TMRc} \equiv \frac{R_{TMRc} - R_{TMRo}}{R_{TMRo}}. \quad (14b)$$

For small changes in the resistance, $\Delta R_{TMRc} \ll 1$, the amplitude drop is linear relative to the change in resistance:

$$f_{amp} \sim 1 - \Delta R_{TMRc} \quad (14c)$$

In some embodiments, the trend for corrosion in an adjacent layer at the surface follows the same trend as corrosion in a removed layer. However, if the corroded region is along the surface of the TMR and results in an increase in effective spacing, the SNR may drop.

Figure 15:
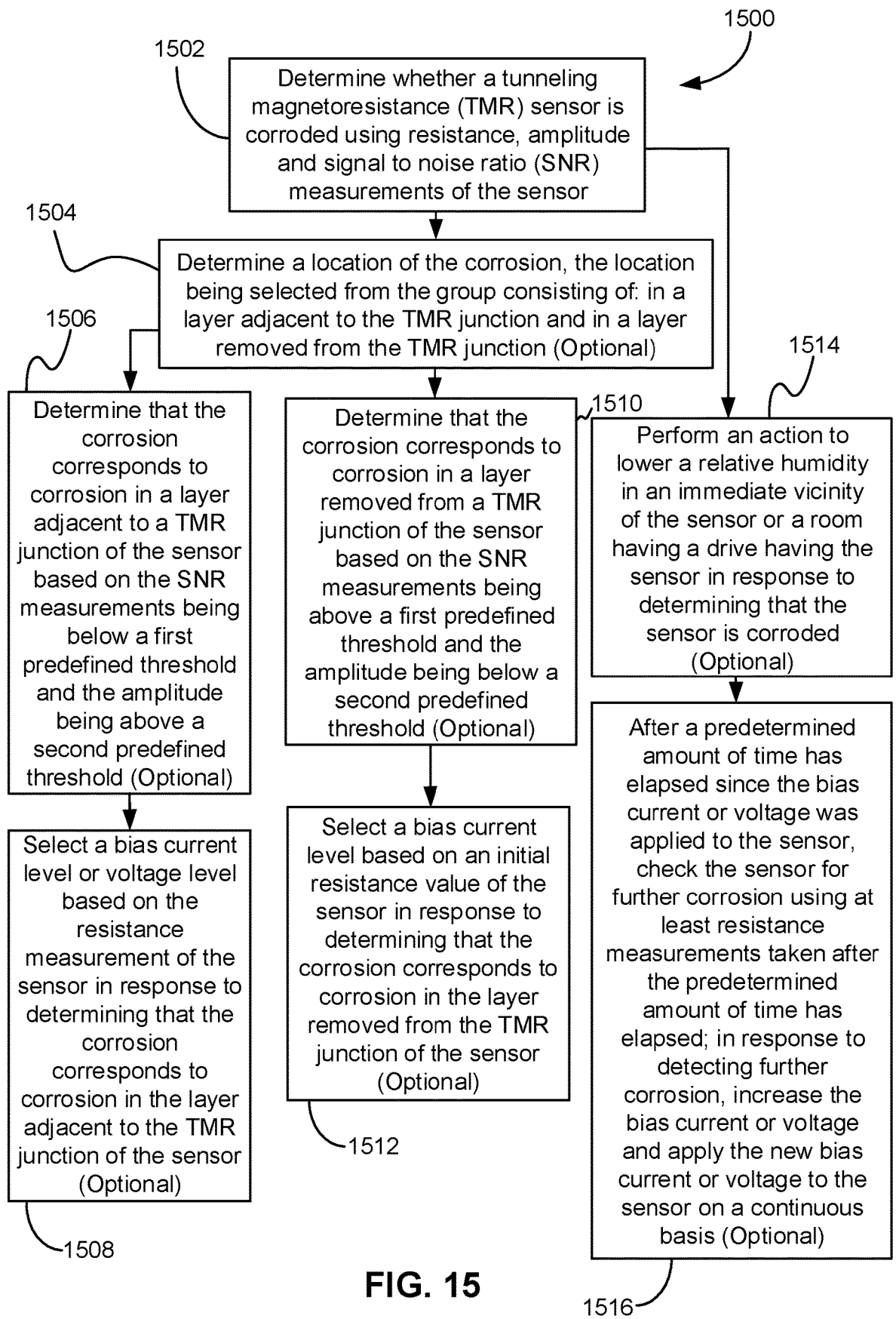
FIG. 15 is a flowchart of a method, in accordance with one embodiment of the present invention.

Now referring to FIG. 15, a flowchart of a method 1500 is shown according to one embodiment. The method 1500 may be performed in accordance with the present invention in any of the environments depicted in FIGS. 1-14 and 16-31, among others, in various embodiments. Of course, more or less operations than those specifically described in FIG. 15 may be included in method 1500, as would be understood by one of skill in the art upon reading the present descriptions.

Each of the steps of the method 1500 may be performed by any suitable component of the operating environment. For example, in various embodiments, the method 1500 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 1500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 15, method 1500 includes operation 1502 which comprises determining whether a tunneling magnetoresistance (TMR) sensor is corroded using resistance, amplitude, and signal to noise ratio SNR measurements of the sensor.

In one configuration, various operations of the method 1500 may be applied to devices comprising one or more TMR sensors. It should be understood by one having ordinary skill in the art that although the various operations refer to applying and/or setting bias currents, voltages, etc., to one sensor, the various bias currents, voltages, etc., may be applied and/or set for a plurality of sensors. In a configuration having a device comprising one or more TMR sensors, the method 1500 may include setting a lower limit for $V_{bias}$ for all the TMR sensors in the device to a minimum safe value, $V_{LLminSafe}$, as discussed in further detail below in operation 1512.

In various embodiments, operation 1502 includes measuring a resistance, $R_{TMR}$. An undamaged state TMR resistance, $R_{TMRoUse}$, may be used for comparison to determine whether the sensor is corroded. The $R_{TMRoUse}$ may be measured in the same TMR sensor, determined during manufacturing, from the design specifications, etc.

Operation 1502 comprises comparing $R_{TMR}$ to $R_{TMRoUse}$. Comparing $R_{TMR}$ to $R_{TMRoUse}$ may include calculating a ratio of the $R_{TMR}$ value and the expected initial resistance value, $R_{TMRoUse}$, and determining whether the ratio is in a predefined range for the TMR sensor. In response to determining that the ratio of the sensor is within the predefined range, operation 1502 may include outputting an indication that the TMR sensor is corroded. In response to determining that the ratio of the sensor is outside the predefined range, operation 1502 may include outputting an indication that the TMR sensor is not corroded. The predefined range may be any predetermined value. Any predefined range disclosed herein may be found in a look up table.

In some approaches, in response to $$100\%\left(\frac{R_{TMR} - R_{TMRoUse}}{R_{TMRoUse}}\right) \geq R_{Clip},$$

the sensor may be determined to be corroded. $R_{Clip}$ may be a predetermined threshold for determining that a sensor is corroded. In a preferred approach, $R_{Clip}=10\%$.

$R_{Clip}$ may be predetermined based on the drive performance. In one example, to distinguish resistance changes due to corrosion from resistance changes due to wear, if the wear is of the order of 30 nm and the stripe height is of the order of 300 nm, then $R_{Clip}$ may be set to be larger than 10% (30 nm/300 nm) to distinguish the source of the corrosion. Corrosion typically affects tracks randomly. In contrast, wear typically affects all tracks. The $R_{Clip}$ value may be set to be relative to the median of all tracks in a multi-track device. $R_{Clip}$ may be set such that maintaining the allowable corrosion level does not affect performance. For example, from Equation (13), a 10, 15 and 20% change in resistance degrades the SNR of that track by −0.46, −0.71 and −0.97 dB respectively.

In some approaches, the amplitude measurement may be denoted by $Amp_{TMR}$ and the signal to noise measurement may be denoted by $SNR_{TMR}$.

In one embodiment, an expected initial resistance, $R_{TMR-Expo}$, for a given track may be determined using a nearest neighbor method, a polynomial fit method, etc. If $R_{TMRoUse} = \max(R_{TMRo}, R_{TMR-Expo})$ and $R_{TMRo} \leq R_{TMR-Expo}$, the sensor may not be initially corroded. If $R_{TMRo} > R_{TMR-Expo}$, the SNR values of all TMRs (e.g., the $SNR_{TMR}$ for each sensor) may be measured to determine a median SNR of all the TMRs in the module, $SNR_{Mod}$, and a standard deviation of SNR for all TMRs in the module, $\sigma_{SNR}$.

In one embodiment, an expected initial resistance, $R_{TMR-Expo}$, may be determined by performing calculations on measurements for a plurality of TMR sensors on a common substrate. The calculations may include measuring a resistance, $R_{TMR}$, for each of the plurality of TMR sensors on the common substrate and performing any of the nearest neighbor methods described in detail below to exclude TMR sensors whose $R_{TMR}$ values are determined to be outliers compared to other TMR sensors on the common substrate.

The conventional method of "nearest neighbor analysis" as described above includes fitting all data to a polynomial and determining outliers by the deviation from the fit. The problem with this conventional approach is that the fit often does not accurately yield the proper expected values because the fit is shifted by including outliers in the fit. Another conventional method for nearest neighbor analysis includes comparing the value of each part to its neighbors. The problem with this conventional approach is that using the minimum deviation from the neighbor misses potential outliers compared to "good" parts and using the maximum deviation from the neighbor oversamples the outliers.

In one illustrative example, using the minimum deviation from the neighbors undersamples the damaged or bad tracks. If track 2 and track 3 are damaged and have similar values to one another, yet the values for track 2 and track 3 are relatively farther from the values of track 1 and track 4, using the minimum deviation will result in comparing track 2 and track 3 to one another. Track 2 and track 3 will be falsely labeled as good even though track 2 and track 3 are relatively farther from the good tracks.

An example of oversampling damaged or bad tracks using the maximum deviation from the neighbors occurs when track 2 is damaged but track 1 and track 3 are good. While the maximum deviation will correctly indicate that track 3 is damaged (e.g., due to a relatively larger deviation from either track 1 or track 3), track 1 and track 3 will be falsely labeled as damaged or bad because track 1 and track 3 have a relatively large deviation from track 2.

An improved nearest neighbor analysis as disclosed herein first excludes outlier TMR sensors using a nearest neighbor method which excludes parts based on the maximum deviation from the two nearest neighbors. Two approaches can be used for the remaining parts (e.g., the nonexcluded parts). A first approach (e.g., a polynomial fit with iterative exclusion method) includes fitting the remaining, nonexcluded parts to a polynomial and then comparing the $R_{TMR}$ value of a sensor to the expected value (e.g., $RD_{SLP-expected}$) from the polynomial fit to determine whether the $R_{TMR}$ value of the sensor is within a predefined range. Any parts which are within a predefined range of the polynomial fit are labeled "good." Any parts which are outside a predefined range of the polynomial fit are labeled "bad." Comparing all parts to the expected value from the polynomial fit and excluding parts which are not within the predefined range of the polynomial fit may be iterated until the labeling of good and bad parts remains about constant. In a preferred approach, the process may be iterated until the labeling of excluded sensors remains about constant for at least two consecutive iterations. In a second approach (e.g., a revised nearest neighbor fit with the iterative exclusion method), the nearest neighbor method of the first step is similarly used to exclude outlier TMR sensors based on the maximum deviation from the two nearest neighbors. TMR sensors within the maximum deviation from the two nearest neighbors may be labeled as good and TMR sensors outside the maximum deviation from the two nearest neighbors may be labeled as bad. The nearest neighbor comparison is repeated using only the two nearest neighbors which were labeled as good on the previous pass. This second approach may be repeated until the labeling of good and bad parts remains about constant. In a preferred approach, the process may be iterated until the labeling of excluded sensors remains about constant for at least two consecutive iterations. In both approaches, the sensors which are labeled as good may be used to create the fit for $RD_{SLP}$ vs. $R_{TMR}$.

Note that the above-mentioned outlier exclusion methods can be used for any parameter in a group of parts which are built and processed simultaneously, and which are expected to be self-similar or nearly identical. In these cases, the values for the parts along the line of parts are expected to vary in a smooth manner so the difference in value from one device to the next in the line should be minimal. In these cases, as long as the parts are good and not damaged, the values of the parameters should be fit well with a polynomial of order 0 (constant), 1 (linear), or 2 (quadratic). Examples of parameters are resistance and/or quasi-static magnetic amplitude for TMR sensors built on a wafer and subsequently processed to lap a row of parts into a tape head module, MRAM, and/or any other semiconductor devices known in the art.

The following definitions may be used in various operations of method 1500:

$$N_\sigma = \sqrt{2}\, erfinv\left(1 - \frac{0.5}{N_{mr}}\right)$$

where $N_{mr}$ is the number of TMR elements in the module.

$\Delta SNR_{TMR} = SNR_{TMR} - SNR_{Mod}$ $$\Delta SNR_{Cal} = -10\log_{10}\left(\frac{R_{TMRo}}{R_{TMR-Expo}}\right)$$

$\Delta SNR_{Mod-Min} = SNR_{Mod} - N_\sigma \cdot \sigma_{SNR}$ $\Delta SNR_{LL} = -1.5$ dB In one embodiment, if $\Delta SNR_{TMR} < \max(\Delta SNR_{cal}, \Delta SNR_{mod\text{-}Min}, \Delta SNR_{LL})$ where $\Delta SNR_{LL}$ is a lower limit drop in SNR chosen by the user, by the manufacturer, by a default system, etc., then $R_{TMRoUse} = R_{TMR\text{-}Expo}$ and the TMR may be initially corroded. In one approach, if $\Delta SNR_{TMR} < \max(\Delta SNR_{cal}, \Delta SNR_{mod\text{-}Min}, \Delta SNR_{LL})$ and the amplitude is large enough that the SNR is media noise limited, the TMR sensor may be initially corroded. The amplitude limit below which SNR is affected by Johnson and/or electronics noise is typically around 1000 µV, but becomes significant at about 250 µV to 500 µV. In one approach, drive developers determine the limit for the drives.

In another embodiment, if $\Delta SNR_{TMR} \geq \max(\Delta SNR_{cal}, \Delta SNR_{mod\text{-}Min}, \Delta SNR_{LL})$, measure the amplitude values of all the TMRs (e.g., $Amp_{TMR}$ for each TMR sensor in the module) using the same bias current $I_{bias} = V_{bias}/R_{TMRo}$ where $V_{bias}$ is a safe operating bias voltage for the TMR. Calculate the median amplitude, $Amp_{Mod}$, and the standard deviation of amplitudes for all TMRs in the module, $\sigma_{Amp}$. If $Amp_{TMR} < Amp_{Mod} - N_\sigma \cdot \sigma_{Amp}$, the TMR sensor may be initially corroded. $R_{TMRoUse} = R_{TMR\text{-}Expo}$ may be used in this approach.

In some embodiments, determining whether a TMR sensor is corroded during use of a drive having the TMR sensor may vary from the above approaches. In response to a determination that the resistance $R_{TMR}$ is relatively low, operation 1502 may include determining that a short exists in the TMR sensor. In the case of an electrical short, $R_{TMRoUse} = \max(R_{TMRo}, R_{TMR\text{-}Expo})$.

In some embodiments, in response to a determination that the resistance $R_{TMR}$ is relatively high, operation 1502 may include determining that a magnetic variability, wire-bond issue, and/or corrosion exists in the TMR sensor. If the $SNR_{TMR}$ and $Amp_{TMR}$ are within an expected (e.g., acceptable) range, as would be understood by one having ordinary skill in the art, operation 1502 may include determining that a magnetic variability and/or wire-bond issues exists in the TMR sensor and the TMR sensor is not corroded.

In preferred embodiments, in response to a determination that a TMR sensor is corroded within an array of TMR sensors, the maximum bias current, $V_{bias\text{-}max}$, may be larger than for the group of TMR sensors.

In various embodiments, in response to a determination that a TMR sensor is corroded, a recommended action and/or a warning may be output. The recommended action and/or warning may be output to a user, to a computer, to a drive, etc. The recommended action and/or warning may be output via any manner known in the art. In some approaches, the recommended action and/or warning may include information associated with the corrosion, the level of corrosion, the location of the corrosion, the number of corroded TMR sensors in the module, etc.

In various embodiments, information about the corrosion event may be stored. Information about the corrosion event may include: the initial effective resistance, the change in resistance, the time and/or date of the change in resistance, the temperature, the relative humidity, the media used, whether the corrosion is considered to be in an adjacent or a removed layer, the bias voltage used prior to corrosion detection, the bias voltage used after corrosion detection, etc.

Operation 1504 includes determining a location of the corrosion in response to determining that the sensor is corroded. A location of the corrosion may refer to the location of the corrosion relative to the TMR junction of the sensor such as an adjacent layer to the TMR junction of the sensor, a layer removed from the TMR junction of the sensor, etc. In a preferred embodiment, the layer removed from the TMR junction of the sensor is removed at least one layer from the TMR junction of the sensor.

Operation 1506 includes determining that the corrosion corresponds to corrosion in a layer adjacent to a TMR junction of the sensor based on the SNR measurements being below a first predefined threshold and the amplitude being above a second predefined threshold. In one approach, a first predefined threshold (in dB units) may be $$\Delta SNR_n \leq -N_\sigma \cdot 10 \log_{10}\left(\frac{R_{TMRo}}{R_{TMRoUse}}\right).$$

A first predefined threshold may be $\Delta SNR_{TMR} < \max(\Delta SNR_{cal}, \Delta SNR_{mod\text{-}Min}, \Delta SNR_{LL})$ in other approaches, where $\Delta SNR_{LL}$ may be set to −0.5 dB, −1.0 dB, −1.5 dB, etc. In another approach, the amplitude may be above predefined threshold. The predefined threshold for the amplitude may be set as 250 µV, 500 µV, 1000 µV etc., above which the SNR is limited by media noise and the SNR is not affected by Johnson and/or electronics noise factors. If the amplitude is low enough that the SNR is not affected by Johnson and/or electronics noise factors, then the $\Delta SNR_{LL}$ threshold may depend on the amplitude value. In other embodiments, a first threshold and/or a second threshold may be optimized by modeling, experimentation, etc.

Corrosion in a layer adjacent to a TMR junction of the sensor results in a narrower effective track width (see FIGS. 13 and 14). The $SNR_{TMR}$ may substantially drop due to the narrower effective track width (see Equation (13)). The $Amp_{TMR}$ may experience a relatively less substantial change due to a narrower effective track width. In one approach, a determination that the corrosion corresponds to corrosion in a layer adjacent to a TMR junction of the sensor is based on low SNR measurements which are not due to electronic and/or Johnson noise.

In one embodiment, the SNR of the $n^{th}$ TMR sensor, $SNR_n$, may be measured. The expected initial SNR of the $n^{th}$ TMR sensor, $SNR_{n\text{-}Expo}$, may be determined using a nearest neighbor method, a method using the median of the array of TMR sensors, a method for determining a polynomial fit, etc. Operation 1506 may include determining that the corrosion corresponds to corrosion in a layer adjacent to a TMR junction of the sensor based on the SNR measurements where $\Delta SNR_n = SNR_n - SNR_{n\text{-}Expo}$ and $$\Delta SNR_n \leq -N_\sigma \cdot 10 \log_{10}\left(\frac{R_{TMRo}}{R_{TMRoUse}}\right).$$

The corrosion may be an area reduction of the TMR sensor.

In one approach, if $\Delta SNR_{TMR} < \max(\Delta SNR_{Cal}, \Delta SNR_{mod\text{-}Min}, \Delta SNR_{LL})$ and the amplitude is set as 250 µV, 500 µV, 1000 µV, etc., above which the SNR is limited by media noise and the SNR is not affected by Johnson and/or electronics noise factors, then a layer adjacent to the TMR junction in the sensor may be corroded.

Operation 1508 includes selecting a bias current level based on the resistance measurement of the sensor in response to determining that the corrosion corresponds to corrosion in the layer adjacent to the TMR junction of the sensor. The resistance measurement may be denoted by $R_{TMR}$. The maximum allowed bias current may be denoted by $I_{bias-Max}$ given by the maximum allowed bias voltage $V_{bias-Max}$. The resistance measurement may be used to set a bias current level using $$I_{bias-Max} = \frac{V_{bias-Max}}{R_{TMRc}}. \tag{15}$$

In other approaches, operation 1508 may include selecting a voltage level based on the resistance measurement of the sensor in response to determining that the corrosion corresponds to corrosion in the layer adjacent to the TMR junction of the sensor.

In one approach, operation 1508 may include selecting a bias voltage in response to determining that the corrosion corresponds to corrosion in a layer adjacent to the TMR junction of the sensor. Selecting a bias voltage may include taking RA as the resistance area product of an uncorroded TMR in the module and an area, Area$_{TJeff}$ (as discussed above as the effective area of the tunnel junction), where Area$_{TJeff}$=RA/R$_{TMR}$ and where R$_{TMR}$ is the currently measured resistance of the TMR and the number of TMR elements is taken as 1.

Operation 1510 includes determining that the corrosion corresponds to corrosion in a layer removed from a TMR junction of the sensor based on the SNR measurements being above a first predefined threshold and the amplitude being below a second predefined threshold. In one approach, a first predefined threshold may be $$\Delta SNR_n > -N_\sigma \cdot 10\log_{10}\left(\frac{R_{TMRo}}{R_{TMRoUse}}\right).$$

A first predefined threshold may be $\Delta SNR_{TMR} \geq \max(\Delta SNR_{Cal}, \Delta SNR_{mod-Min}, \Delta SNR_{LL})$ in other approaches.

In setting the SNR limits, the values may be different depending on whether the amplitude is above a predefined threshold, such as 250 µV, 500 µV, 1000 µV, etc., above which the SNR is media noise limited and not affected by Johnson and/or electronics noise factors. If the amplitude is low such that the SNR is affected by Johnson and/or electronics noise factors, then the $\Delta SNR_{LL}$ depends on the amplitude, to account for the Johnson and/or electronics noise factors. In other embodiments, a first threshold and/or a second threshold may be optimized by modeling, experimentation, etc.

Corrosion in a layer removed from the TMR junction of a sensor results in series resistance. The amplitude may not experience a substantial change at the same bias current. Corrosion in a layer removed from the TMR junction of a sensor may not affect SNR as long as the amplitude is sufficient (e.g., greater than the value for the given TMRs in the given drive in which the SNR is media noise limited and not affected by Johnson and/or electronics noise factors, such as when the amplitude is at 250 µV, 500 µV, 1000 µV, etc.).

In one embodiment, determining that the corrosion corresponds to corrosion in a layer removed from a TMR junction of the sensor based on the SNR measurements includes determining $$\Delta SNR_n > -N_\sigma \cdot 10\log_{10}\left(\frac{R_{TMRo}}{R_{TMRoUse}}\right),$$

and a drop in amplitude given by Equation (4b) when biased using Equation (4a).

In other approaches, determining that the corrosion corresponds to corrosion in a layer removed from a TMR junction of the sensor based on the SNR measurements being at an expected and/or acceptable value as would be understood by one having ordinary skill in the art and the amplitude being below a second predefined threshold. Corrosion in a layer removed from the TMR junction of a sensor adds resistance in a serial manner to the sensor.

In one embodiment, if the element with high resistance recovers and/or is unstable, a sensor which was previously determined to be corroded may be recategorized as either being magnetically unstable and/or subject to wire-bond issues.

In another embodiment, if the SNR is below a predefined threshold and the amplitude is below a level where Johnson and/or electronics noise becomes significant (e.g., approximately from about 750 µV down to about 250 µV), the cause may be unclear and an additional operation of method 1500 may include outputting a recommendation to change the head of the TMR sensor via any of the techniques discussed above.

Operation 1512 includes selecting a bias current level based on an initial resistance value of the sensor in response to determining that the corrosion corresponds to corrosion in the layer removed from the TMR junction of the sensor. The initial resistance value may be $R_{TMR-Expo}$. The maximum allowed bias current may be denoted by $I_{bias-Max}$ given by the maximum allowed bias voltage $V_{bias-max}$. The initial resistance value may be used to set a bias current level using $$I_{bias-Max} = \frac{V_{bias-Max}}{R_{TMRoUse}}.$$

In one approach, operation 1512 may include selecting a bias voltage in response to determining that the corrosion corresponds to corrosion in a layer removed from a TMR junction of the sensor based on the SNR measurements. Selecting a bias voltage may include taking RA as the resistance area product of an uncorroded TMR in the module and an area, Area$_{TJeff}$ (as discussed above as the effective area of the tunnel junction), where Area$_{TJeff}$=RA/R$_{TMRUse}$.

In one embodiment, in response to determining that the TMR sensor is corroded using resistance, amplitude, and signal to noise ratio (SNR) measurements of the sensor, method 1500 may include setting a lower limit for $V_{bias}$ for all TMR sensors in the module comprising at least one corroded TMR sensor. The lower limit for the $V_{bias}$ may be a minimum safe value, $V_{LLminsafe}$, for avoiding corrosion. In a preferred approach, the $V_{LLminSafe}$ is at least 67% of the maximum allowed voltage for the sensors as defined by the user, the manufacturer, a default setting, the drive, etc.

Operation 1514 includes performing an action to lower a relative humidity in an immediate vicinity of the sensor in response to determining that the sensor is corroded. Lowering the relative humidity protects sensors from further corrosion. In a preferred embodiment, the maximum allowed relative humidity may be 70%.

In one embodiment, a minimum allowed bias voltage may be set for all TMRs in the array at a level sufficient to protect the sensors from further corrosion. In a preferred embodiment, the minimum allowed operating voltage is 160 mV for an RA of a TMR sensor below 35Ω·µm$^2$ and the minimum allowed operating voltage is 180 mV for an RA of a TMR sensor greater than $35\Omega\cdot\mu m^2$. In other embodiments, the bias voltage may be selected according to operation 1508 and 1512 above. Operation 1514 may include, in response to selecting a bias voltage, applying the bias voltage to the sensor on a continuous basis.

In some embodiments, an action may include heating an interior of a drive having the sensor. In other embodiments, an action may include heating a room comprising a drive having the sensor. Any heating element known in the art may be used to heat an interior of a drive having the sensor and/or heating a room comprising a drive having the sensor.

In other embodiments, an action may include heating an interior of a drive and/or heating the interior of the room comprising the drive having the sensor and selecting a bias voltage and applying the bias voltage to the sensor on a continuous basis.

Operation 1516 includes, after a predetermined amount of time has elapsed since the bias voltage was applied to the sensor, checking the sensor for further corrosion using at least resistance measurements taken after the predetermined amount of time has elapsed and, in response to detecting further corrosion, selecting a higher bias voltage and applying the higher bias voltage to the sensor on a continuous basis. Operation 1516 may include measuring resistances in TMR sensors at least two times. In response to an increase in resistance, the bias voltage may be increased. The cycle of operation 1516 (e.g., time elapse, measure resistance, increase bias voltage) may be reiterated for preventing further corrosion in the TMR sensor up until the bias voltage reaches the maximum value for safe operation in the drive as determined by the user, the manufacturer, a default setting, etc. In a preferred approach, the predetermined amount of time may be set to 1 hour and doubled after each predetermined amount of time has elapsed (e.g., for each cycle) up to a maximum of 24 hours.

In another embodiment, operation 1516 may include, after a predetermined amount of time has elapsed since the heating an interior of a drive having the sensor (and/or the room comprising the drive having the sensor), checking the sensor for further corrosion using at least resistance measurements taken after the predetermined amount of time has elapsed and, in response to detecting further corrosion, increasing the temperature in the drive. Operation 1516 may include measuring resistances in TMR sensors at least two times. The cycle of operation 1516 (e.g., time elapse, measure resistance, increase temperature) may be reiterated for preventing further corrosion in the TMR sensor up until the temperature reaches the maximum value for safe operation of the drive as determined by the user, the manufacturer, a default setting, etc. In a preferred approach, the predetermined amount of time may be set to 1 hour and doubled after each predetermined amount of time has elapsed (e.g., for each cycle) up to a maximum of 4 hours.

In various approaches, corrosion in a removed (e.g., distant) layer may be determined by measuring the resistance of a given TMR sensor, $R_{TMRc}$, and determining that the resistance is relatively increased by a given fraction, $\Delta R_f$, compared to the neighboring TMR sensors. For a device containing several TMRs built in the same wafer and processed (lapped) simultaneously, determining whether a given track is an outlier for $\Delta R_f$ may utilize nearest neighbor methods, including the improved nearest neighbor methods described herein for determining the initial expected resistance. In the case of corrosion in a removed layer, the amplitude when biased by a current (e.g., $I_{bias}=V_{bias}/R_{TMRc}$) drops by $-\Delta R_p$ and the SNR is not significantly impacted. In the case of corrosion in a removed layer, the TMR sensor may be biased by using the initial resistance, $R_{TMRo}$, for $I_{bias}=V_{bias}/R_{TMRo}$ and an action may be performed to lower the relative humidity of the drive and/or the room in which the drive is located as described above.

In other approaches, corrosion in an adjacent layer with width, $W_c$, may be identified by an increase in resistance of a given TMR sensor by a given fraction, $\Delta R_f$, compared to the neighboring TMR sensors utilize nearest neighbor methods, including the improved nearest neighbor methods described herein for determining the initial expected resistance. The amplitude when biased by a current (e.g., $I_{bias}=V_{bias}/R_{TMRc}$) does not drop by a value close to $$-\Delta R_f\left(=1-\frac{R_{TMRo}}{R_{TMRc}}\right).$$

For a TMR sensor with corrosion in a layer adjacent to the tunnel junction, $$\Delta SNR \lesssim 10\log_{10}\left(\frac{R_{TMRo}}{R_{TMRc}}\right).$$

The TMR may be biased by using the measured resistance, $R_c$, for $I_{bias}=V_{bias}/R_{TMRc}$, and an action may be performed to lower the relative humidity of the drive and/or the room in which the drive is located as described above. The minimum bias voltage may also be increased to lower the local relative humidity of the sensor.

In other approaches, corrosion in an adjacent layer across the entire width, W, and depth, $H_c$, may be identified by an increase in resistance of a given TMR sensor by a given fraction, $\Delta R_f$, compared to the neighboring TMR sensors. The amplitude when biased by a current (e.g., $I_{bias}=V_{bias}/R_{TMRc}$) drops fractionally by a value close to $-\Delta R_f$. For a TMR sensor with corrosion in a layer adjacent to the tunnel junction, the SNR drops in a consistent pattern as with a spacing loss. The TMR may be biased by using the measured resistance, $R_c$, for $I_{bias}=V_{bias}/R_{TMRc}$, and an action may be performed to lower the relative humidity of the drive and/or the room in which the drive is located as described above. The minimum bias voltage may also be increased to lower the local relative humidity of the sensor.

Figure 16:
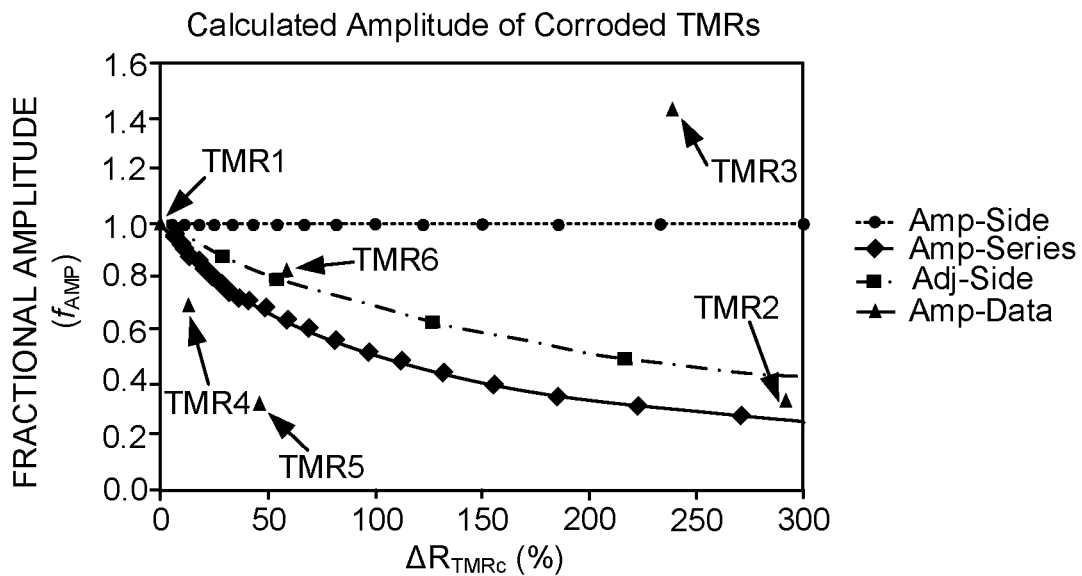
FIG. 16 is a plot of fractional amplitude, $f_{AMP}$, versus $\Delta R_{TMRc}$, in accordance with one embodiment of the present invention.

FIG. 16 plots the fractional amplitude, $f_{AMP}$, versus $\Delta R_{TMRc}$ for corroded TMR sensors. As shown, TMR3 has a very high amplitude (+44%) despite the relatively high $\Delta R_{TMRc}$ of ~250%. TMR3 is considered corroded in an adjacent layer. TMR6 has an amplitude higher than expected from corrosion in a removed layer and is considered close to the curve for the minimum expected value for the given $\Delta R_{TMRc}$. TMR6 is considered corroded in an adjacent layer. TMR2 is between the curves for the minimum expected value for the given $\Delta R_{TMRc}$ for corrosion in an adjacent layer but slightly higher than expected from corrosion in a removed layer. TMR2 is considered ambiguous. The ambiguity may be removed by measuring the SNR. TMR4 and TMR5 both have amplitudes well below the values expected for either corrosion in a removed layer or corrosion in an adjacent layer with no spacing loss. TMR 4 and TMR5 are most likely corroded in an adjacent layer with either spacing losses or stress induced damage to the TMR sensor.

Figure 17:
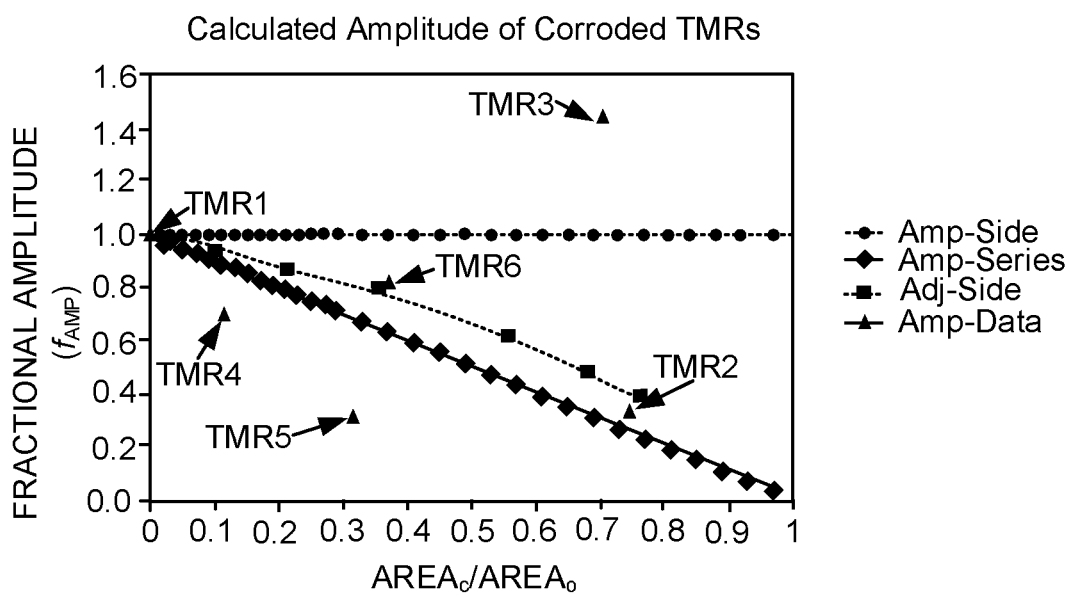
FIG. 17 is a plot of $f_{AMP}$ versus $Area_c/Area_o$ using Equation (7), in accordance with one embodiment of the present invention.

FIG. 17 plots $f_{AMP}$ versus $Area_c/Area_o$. FIG. 17 depicts the same data as for FIG. 16 plotted as the fractional corroded area assuming the corrosion is in an adjacent layer. As shown, the SNR drops if the sensor becomes unstable.

The SNR drops in response to a corroded region along the surface of the TMR resulting in an increase in effective spacing. Amp-Series denotes a series resistance. Amp-Surface denotes where $W_{eff2}=W_o$ and $H_c \ne H_o$. Amp-Side denotes where $W_{eff2}>0$ and $W_{eff2} \ne 0$.

In one approach, a broad band SNR (BBSNR) drops by 0.15 and 0.25 dB/nm for a linear density of 300 and 400 kfci respectively. A change in resistance for a corrosion depth of 10 nm for a sensor with a stripe height of 400 nm is about +2.5%. A change in SNR for a corrosion depth of 10 nm for a sensor with a stripe height of 400 nm is about −1.5 dB.

Figure 18:
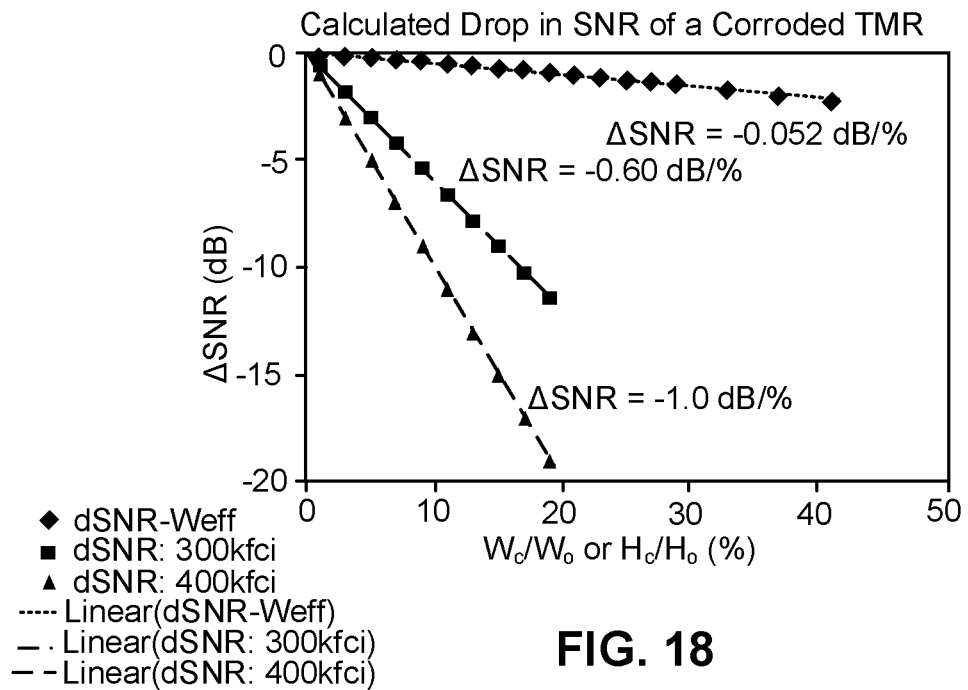
FIG. 18 is a plot of the drop in SNR of a corroded TMR, in accordance with one embodiment of the present invention.

FIG. 18 plots the drop in SNR in the case of corrosion across the entire width of the TMR at the TBS to a depth $H_c$ for an initial stripe height of 400 nm. The calculated drop in SNR for a corroded TMR is plotted against the corroded $W_c/W_o$. The $W_c/W_o$ may be $H_c/H_o$ in some approaches.

In one approach, where the corroded region penetrates from the TBS to H across a width $W_c$, the TMR is effectively a narrower device with a width W. When the TMR sensor is biased at the same voltage, the amplitude does not change significantly. The voltage SNR decreases as the square-root of $W_{eff1}/W$. In dBs, the change in SNR, ΔSNR, is given by Equation (13).

The change in amplitude for corrosion in an adjacent layer may be less than that of the drop in amplitude for corrosion in a removed layer. In some embodiments, the drop in signal amplitude may be more for corrosion in a removed layer. Sensors with corrosion in removed layers follow the trend given by Equation (4). SNR may drop in the case of corrosion in an adjacent layer but is not affected by corrosion in a removed layer.

FIG. 18 plots the drop in SNR with $W_c$. For corrosion across the entire width of the stripe, $W_c=W$, to a depth $H_c$, the slope of the change in SNR versus change in area (or to $1^{st}$ order, resistance) is −0.6 dB % at a linear density of 300 kfci and −1.0 dB % at 400 kfci. For corrosion across a width, $W_c$, through the entire stripe height, with no spacing loss, the drop in SNR is −0.052 dB %. A 10, 15, or 20% increase in resistance results in a −0.52, 0.78, and −1.04 dB drop in SNR respectively.

Figure 19:
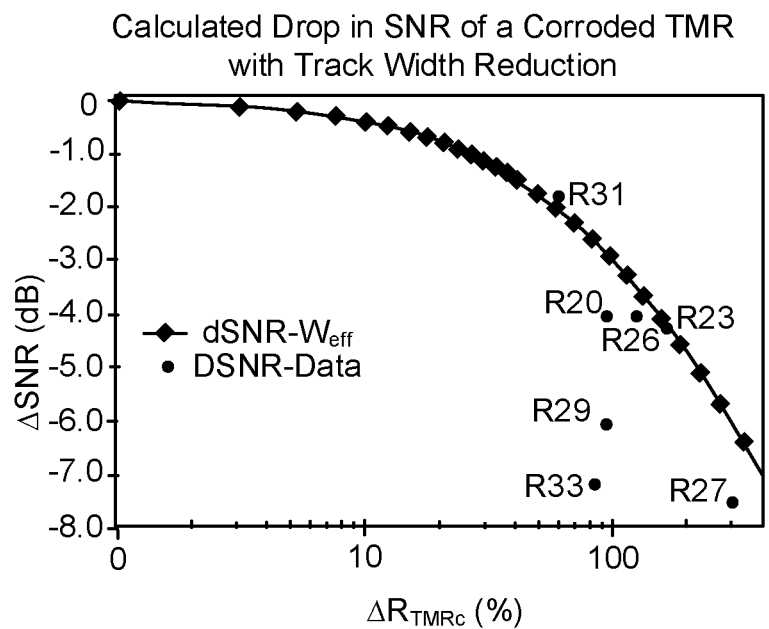
FIG. 19 is a plot of $\Delta SNR$ versus $\Delta R_{TMRc}$, in accordance with one embodiment of the present invention.

FIG. 19 plots ΔSNR versus the change in resistance for the case of corrosion in the track width of effective length $W_c$ and assuming the corrosion is through the depth of $H_c=H$ or no signal comes from the corroded section. Data (DSNR-Data) is plotted for actual drive data for resistance increases from about 60% to about 300%. In all cases, the SNR drops by at least −1.9 dB.

FIG. 20 is a table of the data plotted in FIG. 19. Tracks R31 and R23 with resistance increases of about 59% and about 164% match the calculated ΔSNR within 0.1 dB. Tracks R20 and R26 are close to the calculated curve. Tracks 29, 27, and 33 have SNR values below the ideal curve. The SNR values may be due to spacing loss effects. The resistance of the other tracks are between about −0.5 and about −4.6 dB lower than calculated resistance assuming the loss in SNR is purely from a decrease in track width.

Figures 21A, 21B:
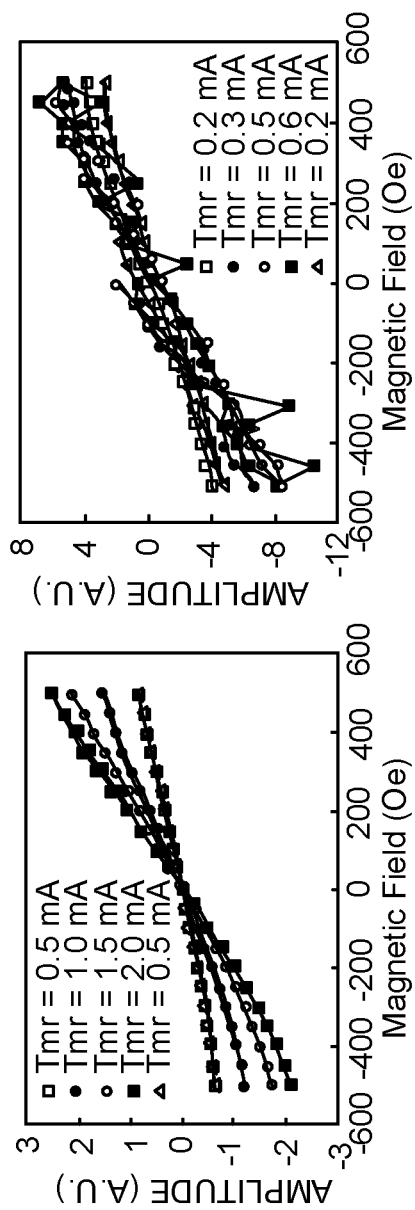
FIG. 21A is a transfer curve of a new TMR (e.g., TMR1) at different bias currents, in accordance with one embodiment of the present invention.
FIG. 21B is a transfer curve of a corroded TMR (e.g., TMR2) at different bias currents, in accordance with one embodiment of the present invention.

FIGS. 21A and 21B show the transfer curves of a new TMR (e.g., TMR1) and a corroded TMR (e.g., TMR2) at different bias currents respectively.

FIG. 22 is a table of the data plotted in FIGS. 21A and 21B. The table comprises data for the TMR resistance ($R_{TMR}$), the expected initial TMR resistance ($R_{TMRo}$), and the amplitude ($V_{sig}$) for the minimum bias current for the TMR sensors. The ratio of voltage signal to the bias voltage is given where $V_{mr}=I_{bias} \cdot R_{TMR}$ is shown. For TMR2, $V_{sig}/V_{mr}$ is about 0.33 times the value of the non-corroded TMR, TMR1.

Referring briefly to FIGS. 16 and 17, TMR2 in FIGS. 16 and 17 may be either a series corrosion or a partially corroded layer adjacent to the tunnel valve (see FIG. 14). For an adjacent layer corrosion, $W_{eff1} \ll W_{eff2}$. Corrosion in an adjacent layer for $W_{eff1} \ll W_{eff2}$ is substantially entirely from the surface of the sensor. The SNR may be mildly affected for the proper biasing. It may be difficult to distinguish between a series corrosion and an adjacent layer corrosion. If a series corrosion is assumed and the bias current is increased with the total bias voltage, the sensor is at risk of dielectric breakdown where the corrosion is actually surface layer corrosion. TMR6 is similarly ambiguous as shown in FIGS. 16 and 17. TMR6 may be a combination of complete corrosion from top-to-bottom for a fractional width and some surface corrosion. However, if the SNR is degraded, then it is most likely corrosion in an adjacent layer. TMR4 and TMR5 are close to corrosion at the surface of the TMR.

Figures 23A, 23B:
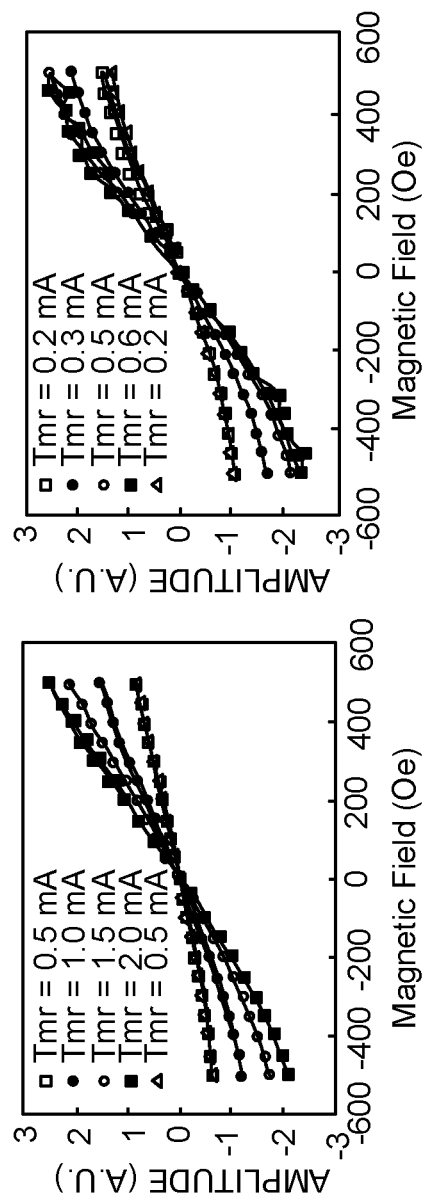
FIG. 23A is a transfer curve of a new TMR (e.g., TMR1) at different bias currents, in accordance with one embodiment of the present invention.
FIG. 23B is a transfer curve of a corroded TMR (e.g., TMR3) at different bias currents, in accordance with one embodiment of the present invention.

FIGS. 23A and 23B show the transfer curves of a new TMR (e.g., TMR1) and a corroded TMR (e.g., TMR3) at different bias currents.

Referring again to FIG. 22, the data plotted in FIGS. 23A and 23B comprises data for the TMR resistance ($R_{TMRc}$), the expected initial TMR resistance ($R_{TMRo}$), and the amplitude ($V_{sig}$) for the minimum bias current for the TMR sensors. The ratio $V_{sig}/V_{mr}$ is given where $V_{sig}=I_{mr} \cdot R_{TMRc}$. TMR 3 is about 144% higher for TMR2 and is only 33% of the value of the non-corroded TMR (TMR1). The transfer curve is clean, indicating that the corrosion did not create stresses damaging the TMR performance. The transfer curve shows a loss in area. The SNR in a drive may be degraded either by a loss in width or spacing losses.

Figure 24B:
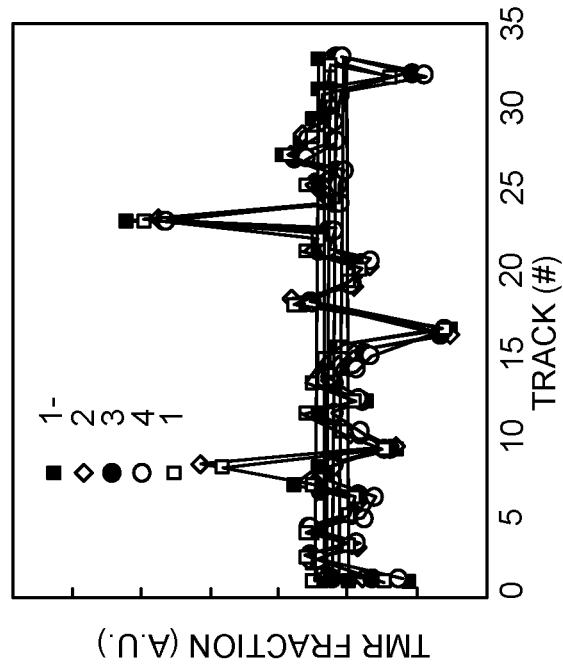
FIGS. 24A and 24B are plots of TMR resistance and TMR fraction versus the track number for 33 tracks of TMRs, in accordance with one embodiment of the present invention.
Figure 24A:
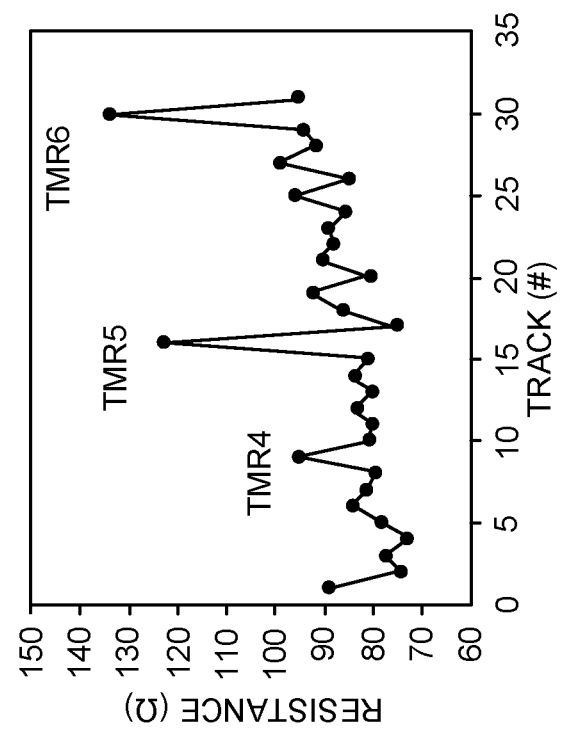

FIGS. 24A and 24B plot TMR resistance and TMR fraction versus the track number for 33 tracks of TMRs. TMR4, TMR5, and TMR6 are corroded. The TMR fraction is the peak-to-peak TMR response at ±100 Oe for bias currents of 1, 2, 3, and 4 times a unit bias current. Tracks 9, 16 and 32 have resistances 13, 46, and 59% greater than the module median and amplitudes of 61, 18 and 53% of the median, respectively. The relationship between the amplitudes and the resistance changes are most consistent with corrosion along the surface of the TMR.

Referring again to FIGS. 16 and 17, to determine the corrosion in the 5 corroded TMRs studied (e.g., TMR2-6), FIGS. 16 and 17 plot the fractional amplitudes of the TMRs versus the delta resistance (see FIG. 16) and versus the fractional area (see FIG. 17). The relevant amplitude and resistance parameters are given by the table in FIG. 22. TMR1 remains an uncorroded, new sensor for reference. TMRs 4 and 5 represent corrosion from the surface and $W_{eff1}=0$. TMR3 represents corrosion in approximately 75% of the sensor and corrosion at the surface of the sensor in the remaining approximately 25%. The SNR of TMR3 in a drive is expected to drop 2.6 dB. The amplitude at the normal bias voltage for TMR3 in a drive is expected to be substantially similar to any neighboring sensors. TMR2 is the closest to series resistance. TMR2 may be a corroded adjacent layer with most of the corrosion being at the surface and some of the surface is still functional. TMR6 is closest to a corroded adjacent layer with much of the uncorroded portion of the TMR being at the surface of the TMR. The SNR of TMR6 is expected to drop 1 dB (see FIG. 18).

A bias current for corroded sensors may be safely set based on the resistance measured in Equation (1) even if the amplitude versus resistance values are close to the curve expected for series corrosion. The probability of dielectric breakdown is lower for the same bias voltage where the area is decreased. If the corrosion is limited to only a few TMRs in a multi-array device, a higher bias voltage than is given for the entire array of parts may be used.

In various embodiments, the signal is sufficiently high to be above the range where Johnson noise becomes significant. For corrosion in a removed layer, the SNR may not be affected. In response to using the corroded resistance to set the voltage biasing, the amplitude may drop. For corrosion in an adjacent layer, the SNR may drop. The amplitude may not drop a significant amount in response to corrosion in an adjacent layer. For corrosion across the entire width of the sensor at the surface, the amplitude may drop below that for corrosion in a removed layer with the same resistance change.

The following equation is given for yielding the maximum operating voltage applied to a group of TMRs:

$$V_{opMax} = \left[\frac{\eta \cdot D}{2 \cdot F}\right]\left[-1 + \sqrt{1 + \left[\frac{2 \cdot F}{\eta \cdot D}\right]^2 \left[\frac{U \cdot D}{F} - D \cdot T_{air}\right]}\right] \quad (15a)$$

$$\text{with } F = \left(\frac{k_B}{\beta}\right)\ln\left(\frac{N \cdot \tau_{LifeGroup} \cdot A_{mr}^{1/\beta}}{B \cdot \tau_{\infty}}\right), \quad (15b)$$

$$\text{and } D = RA \cdot (K_a + K_c/A_{mr}) \quad (15c)$$

$$\text{and } \eta = \gamma Z a/t_B \quad (15d)$$

B may be the "allowed" fraction of a device with N TMRs in order for the device to have at least 1 TMR suffer dielectric breakdown within time $\tau_{LifeGroup}$. $A_{mr}$ is the area of an individual TMR, RA is the resistance area of the TMRs, $t_B$ is the tunnel junction thickness, and Z is the charge and a lattice spacing of the metal in the tunnel junction ozide. The parameters β, U, and $t_{\infty}$ are parameters fitting the dielectric breakdown of the TMRs and $k_B$ is Boltzman's constant. $T_{air}$ is the ambient temperature to which the devices are exposed.

The studied TMRs comprise crystalline MgO for the tunnel junction, with an RA of 40Ω·μm² and $t_B$ of approximately 1.4 nm. U is 1.75 eV, β is 1, $t_{\infty}$ is $1.2 \cdot 10^{-9}$ s·μm⁻², a is 0.41 nm, Z is 2, $k_o$ is 14 μW·°C.⁻¹ and $k_A$ is 42 μW·°C.⁻¹·μm⁻² for this model.

Figure 25:
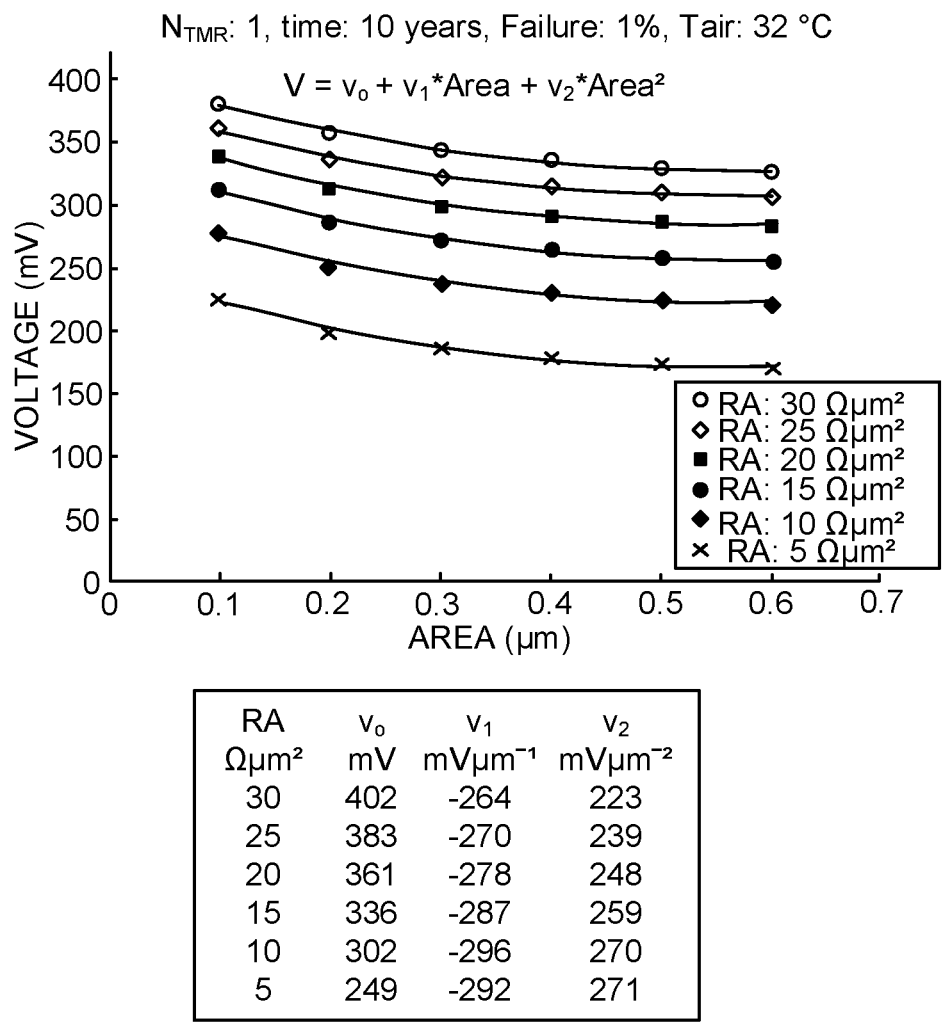
FIG. 25 is a plot of the maximum bias voltage, $V_{op-Max}$, versus TMR area for 1% failure over 10 years for a TMR with an RA between 5 and 30Ω·µm², in accordance with one embodiment of the present invention.

FIG. 25 plots the maximum bias voltage, $V_{op-Max}$, versus TMR area for 1% failure over 10 years for a TMR with an RA between 5 and 30Ω·μm². $V_{op-Max}$ may be fit with the following quadratic equation:

$$V_{op-Max} = V_o + V_1 \cdot A_{mr} + V_2 \cdot A_{mr}^2 \quad (16)$$

The fitting parameters are tabulated in the figure versus RA.

Figure 26:
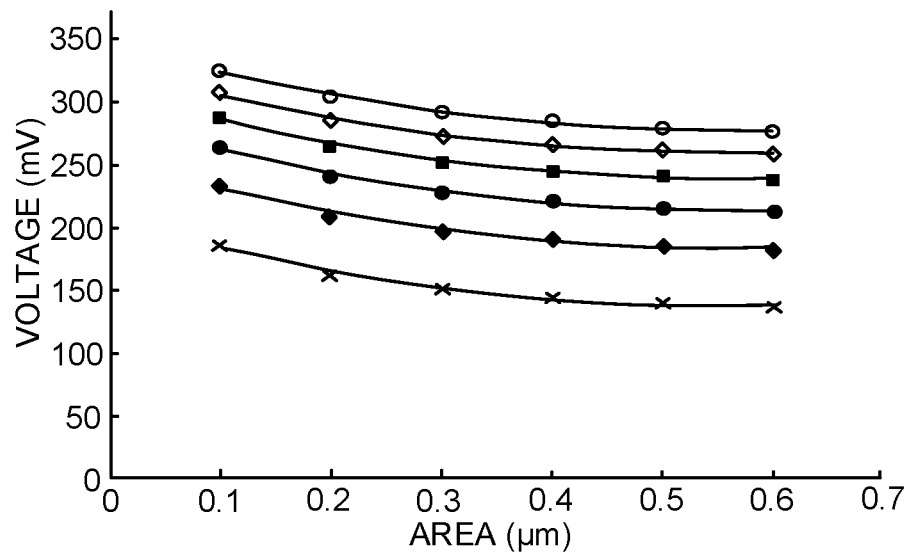
FIG. 26 is a plot of the maximum bias voltage, $V_{op-Max}$, versus TMR area for 1% failure over 10 years for TMRs with RAs between 5 and 30Ω·µm² for a group of 33 TMRs, in accordance with one embodiment of the present invention.

FIG. 26 plots the maximum bias voltage, $V_{op-Max}$, versus TMR area for 1% failure over 10 years for TMRs with RAs between 5 and 30Ω·μm² for a group of 33 TMRs. $V_{op-Max}$ may be fit with Equation (16) and the fitting parameters are tabulated in the figure versus RA.

Figure 27:
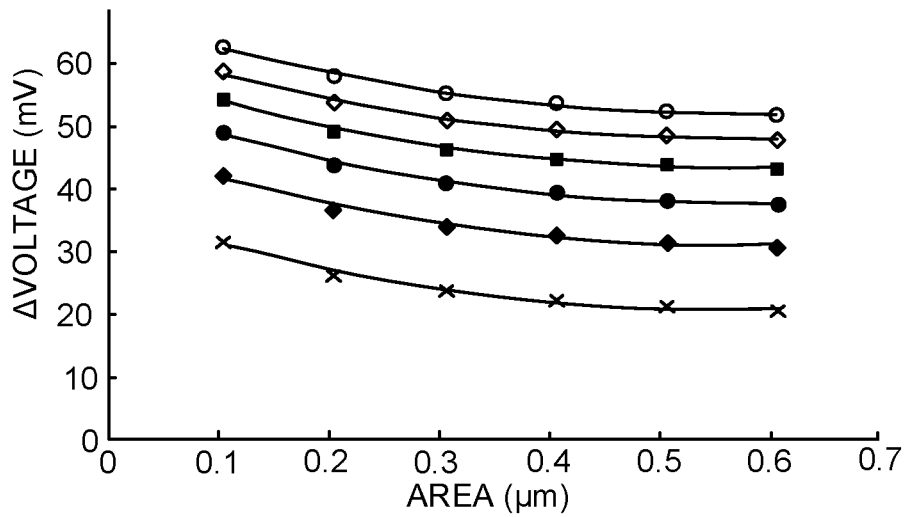
FIG. 27 is a plot of the increase in allowed bias voltage versus TMR area for a 1% failure over 10 years for a TMR with an RA between 5 to 30Ω·µm² when comparing a single part with a group of 33 TMRs using Equation (17), in accordance with one embodiment of the present invention.

FIG. 27 plots the increase in allowed bias voltage versus TMR area for a 1% failure over 10 years for a TMR with an RA between 5 and 30Ω·μm² when comparing a single part with a group of 33 TMRs using:

$$\Delta V_{op-Max} = V_{op-Max}(N=1) - V_{op-Max}(N=33) = \Delta V_o + \Delta V_1 \cdot A_{mr} + \Delta V_2 \cdot A_{mr}^2 \quad (17)$$

The fitting parameters are tabulated in the figure versus RA.

Figure 28:
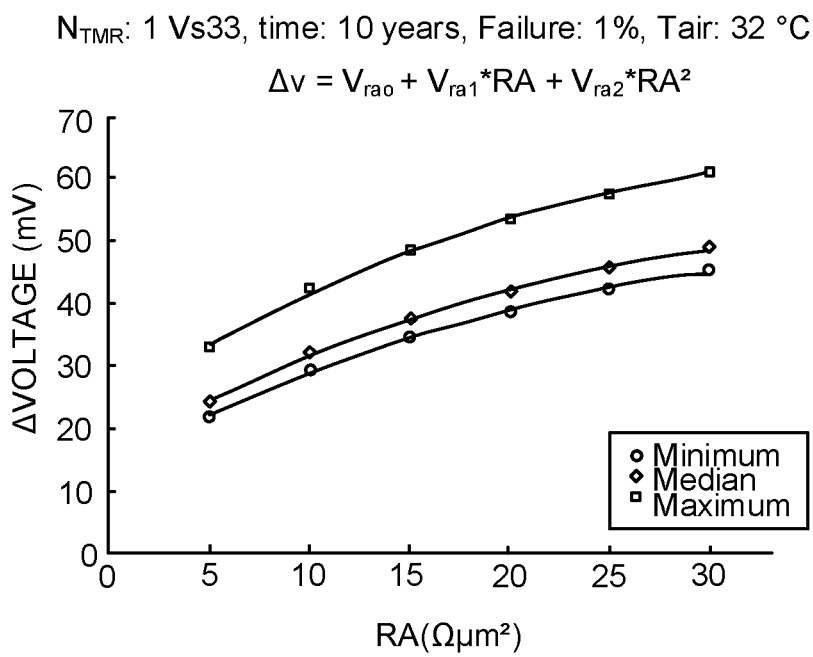
FIG. 28 is a plot of the minimum, median, and maximum increase in allowed bis voltage versus TMR RA for a 1% failure over 10 years for a TMR with an area between 0.1 and 0.6 µm² when comparing a single part with a group of 33 TMRs, in accordance with one embodiment of the present invention.

FIG. 28 plots the minimum, median, and maximum increase in allowed bias voltage versus TMR RA for a 1% failure over 10 years for a TMR with an area between 0.1 and 0.6 μm² when comparing a single part with a group of 33 TMRs. The minimum, median, and maximum voltages increases may be fit to a quadratic equation in the RA:

$$V_{bias:1\ Vs33} = V_o + V_1 RA + V_2 RA^2 \quad (18)$$

The fitting parameters are tabulated in the figure versus minimum, median, and maximum.

The allowed bias voltage may be higher for lower areas with fewer parts considered. FIG. 28 demonstrates that, for a group of 33 TMRs with an RA of 30Ω·μm², if one of the TMRs is corroded, the allowed bias voltage may be safely increased for the TMR to between about 40 mV and about 60 mV over the allowed maximum operating bias voltage for all TMRs in the group.

Figure 29:
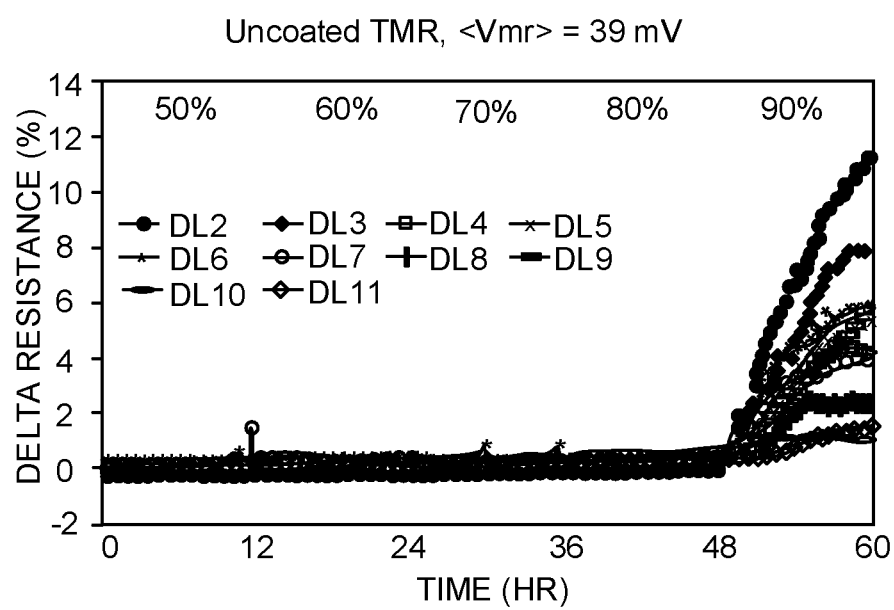
FIG. 29 is a plot of a change in resistance versus time for 10 corroded TMRs biased to 39 mV, in accordance with one embodiment of the present invention.

FIG. 29 plots a change in resistance versus time for 10 corroded TMRs biased to 39 mV. The drive environment is about 50° C. and the relative humidity increases from about 50% to about 90% over 12 hour intervals for this model. FIG. 29 shows corrosion above a given relative humidity over a given time. For example, more corrosion occurs at lower relative humidity levels. Most parts do not corrode where the relative humidity is less than 70%. Very few parts corrode where the relative humidity is less than 50%. FIG. 29 shows also shows higher levels of relative humidity results in more corrosion over a shorter period of time.

Figure 30:
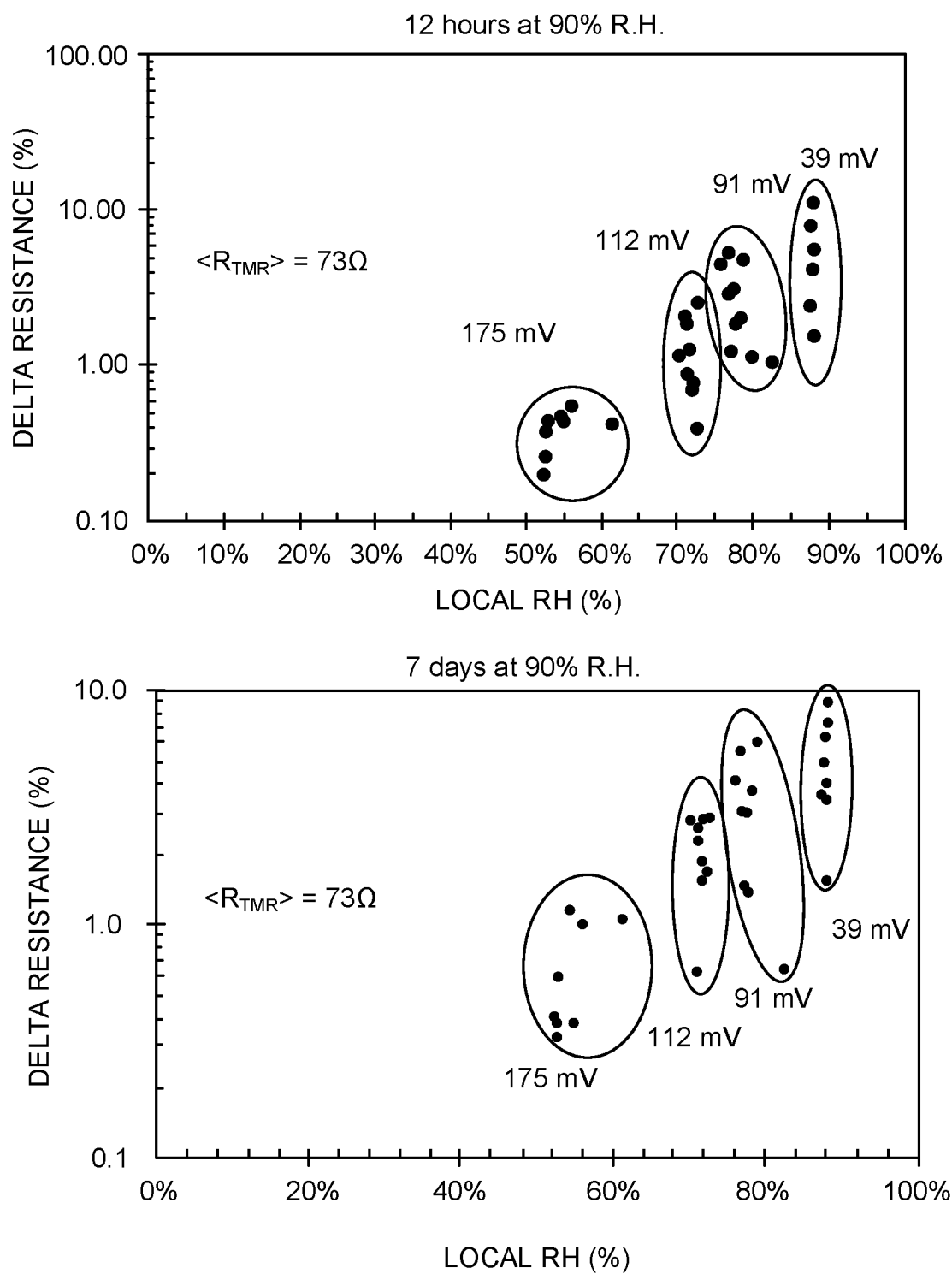
FIG. 30 is a plot of a change in resistance versus local relative humidity for uncoated TMRs with a corrosive ion on the surface after 12 hours or 7 days of exposure to about 50° C. and 90% relative humidity, in accordance with one embodiment of the present invention.

FIG. 30 plots a change in resistance versus local relative humidity for uncoated TMRs with a corrosive ion on the surface after 12 hours or 7 days of exposure to about 50° C. and 90% relative humidity. The TMRs were biased in groups of 39, 91, 112, and 175 mV. The local relative humidity may be based on the Joule heating temperature with the chamber moisture. The TMR sensors had a coupon level RA of 40Ω·μm² (final RA of approximately 54Ω·μm²) and an area of 0.5 μm² with resistance of 73Ω. FIG. 30 demonstrates the reduced rate of corrosion due to lowering the relative humidity using Joule heating. In another approach, increasing the temperature in the drive having at least one TMR sensor reduces the relative humidity.

Figure 31:
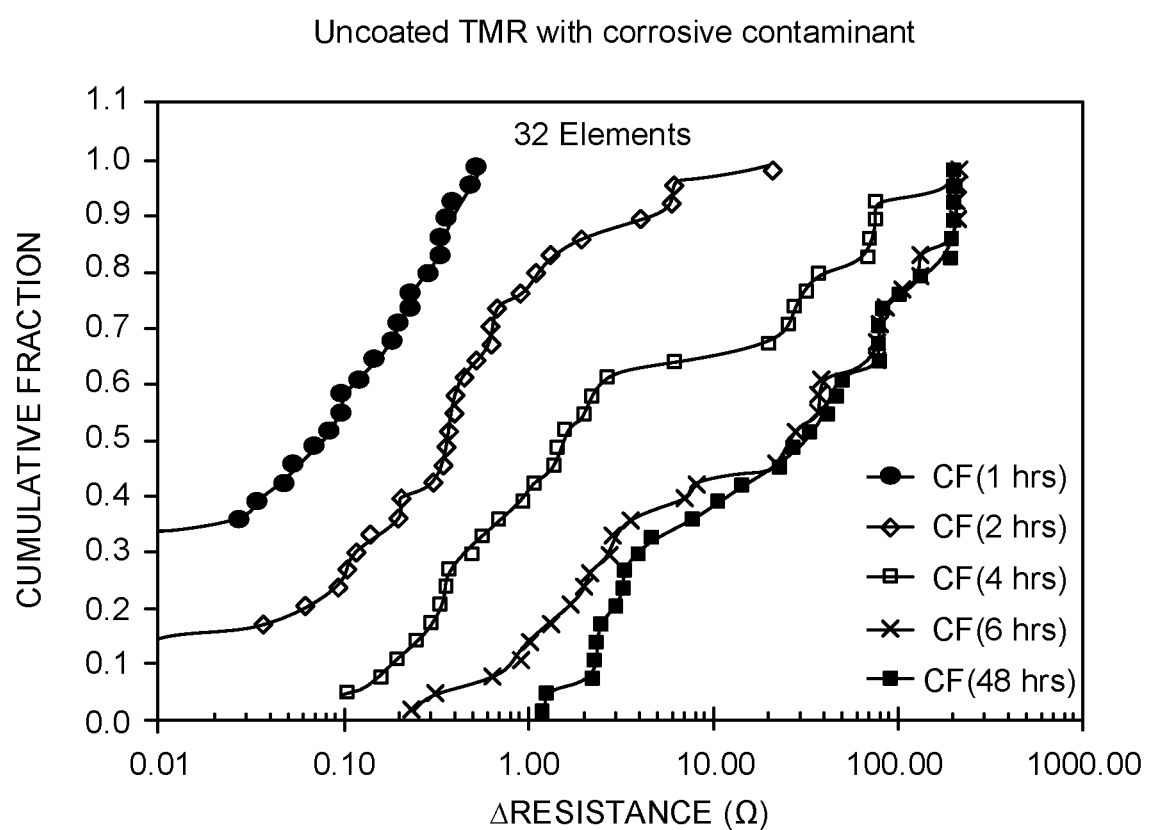
FIG. 31 is a plot of the corrosion of highly contaminated TMRs, in accordance with one embodiment of the present invention.

FIG. 31 plots the corrosion in highly contaminated TMRs (e.g., greater than about 10% corrosive contaminant on the surface). The cumulative fraction versus the change in resistance is plotted for 1, 2, 4, 6, and 48 hours of exposure to a relative humidity of 80%. The bias voltage of 120 mV was insufficient for very high contamination levels and the corrosion occurred relatively rapidly. It is expected that 120 mV may be sufficient for levels of corrosion on the order of 1% corrosive contamination on the surface.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    determining whether a tunneling magnetoresistance (TMR) sensor is corroded using resistance, amplitude and signal to noise ratio (SNR) measurements of the sensor; and
    performing an action to lower a relative humidity in an immediate vicinity of the sensor in response to determining that the sensor is corroded, wherein the action includes increasing a lower limit for a bias current and/or voltage for all TMR sensors in a device and applying the lower limit for the bias current and/or voltage to all TMR sensors in the device on a continuous basis.

2. The method as recited in claim 1, comprising determining a location of the corrosion, the location being selected from the group consisting of: in a layer adjacent to a TMR junction and in a layer removed from the TMR junction.

3. The method as recited in claim 2, comprising determining that the corrosion corresponds to corrosion in a layer adjacent to a TMR junction of the sensor based on the SNR measurements being below a first predefined threshold and the amplitude being above a second predefined threshold.

4. The method as recited in claim 3, comprising selecting a bias current level based on a resistance measurement of the sensor in response to determining that the corrosion corresponds to corrosion in the layer adjacent to the TMR junction of the sensor.

5. The method as recited in claim 2, comprising determining that the corrosion corresponds to corrosion in a layer removed from a TMR junction of the sensor based on the SNR measurements being above a first predefined threshold and the amplitude being below a second predefined threshold.

6. The method as recited in claim 5, comprising selecting a bias current level based on an initial resistance value of the sensor in response to determining that the corrosion corresponds to corrosion in the layer removed from the TMR junction of the sensor.

7. The method as recited in claim 1, comprising performing an action to lower a relative humidity in a room having a drive having the sensor in response to determining that the sensor is corroded.

8. The method as recited in claim 1, comprising, after a predetermined amount of time has elapsed since the bias current and/or voltage was applied to the TMR sensors, checking the TMR sensors for further corrosion using at least resistance measurements taken after the predetermined amount of time has elapsed; in response to detecting further corrosion, increasing the lower limit for the bias current and/or voltage for all TMR sensors in a device; and applying the new lower limit for the bias current and/or voltage to all TMR sensors in the device on a continuous basis.

9. A computer program product to select a bias current in a corroded tunneling magnetoresistance (TMR) sensor, the computer program product comprising a computer readable storage medium having program instructions embodied therewith, the program instructions executable by a computer to cause the computer to:
    determine whether a tunneling magnetoresistance (TMR) sensor is corroded using resistance, amplitude and signal to noise ratio (SNR) measurements of the sensor; and
    determine a location of the corrosion, the location being selected from the group consisting of: in a layer adjacent to a TMR junction and in a layer removed from the TMR junction.

10. The computer program product of claim 9, comprising program instructions to cause the computer to determine that the corrosion corresponds to corrosion in a layer adjacent to a TMR junction of the sensor based on the SNR measurements being below a first predefined threshold and the amplitude being above a second predefined threshold.

11. The computer program product of claim 10, comprising program instructions to cause the computer to select a bias current level or voltage level based on a resistance measurement of the sensor in response to determining that the corrosion corresponds to corrosion in the layer adjacent to the TMR junction of the sensor.

12. The computer program product of claim 9, comprising program instructions to cause the computer to determine that the corrosion corresponds to corrosion in a layer removed from a TMR junction of the sensor based on the SNR measurements being above a first predefined threshold and the amplitude being below a second predefined threshold.

13. The computer program product of claim 12, comprising program instructions to cause the computer to select a bias current level based on an initial resistance value of the sensor in response to determining that the corrosion corresponds to corrosion in the layer removed from the TMR junction of the sensor.

14. The computer program product of claim 9, comprising program instructions to cause the computer to perform an action to lower a relative humidity in an immediate vicinity of the sensor and/or a room having a drive having a sensor in response to determining that the sensor is corroded.

15. The computer program product of claim 14, wherein the action increasing a lower limit for the bias current and/or voltage for all TMR sensors in a device and applying the lower limit for the bias current and/or voltage to all TMR sensors in the device on a continuous basis.

16. A method to determine whether a tunneling magnetoresistance (TMR) sensor is corroded, the method comprising:
    determining an expected initial resistance value, $R_{TMRoUse}$;
    measuring a resistance value, $R_{TMR}$, of the TMR sensor;
    calculating a ratio of the $R_{TMR}$ value and the expected initial resistance value, $R_{TMRoUse}$;
    determining whether the ratio is in a predefined range for the TMR sensor;

in response to determining that the ratio of the TMR sensor is within the predefined range, outputting an indication that the TMR sensor is corroded; and in response to determining that the ratio of the TMR sensor is outside the predefined range, outputting an indication that the TMR sensor is not corroded.

17. The method of claim 16, wherein the expected initial resistance value, $R_{TMRoUse}$, is determined by performing calculations on measurements for a plurality of TMR sensors on a common substrate, the calculations performed on the measurements for the plurality of TMR sensors comprising:

measuring a resistance, $R_{TMR}$, for each of the plurality of TMR sensors on the common substrate;

excluding TMR sensors whose $R_{TMR}$ values are determined to be outliers compared to other TMR sensors on the common substrate using a nearest neighbor method which excludes parts based on the maximum deviation from the two nearest neighbors; and fit the nonexcluded $R_{TMR}$ values for the TMR sensors to a polynomial of $R_{TMR}$ vs. TMR track, m, wherein m is sequential from 1 to the number of TMR sensors located on a common substrate; and determining the expected initial resistance value, $R_{TMRoUse}$, based on the polynomial fit of $R_{TMR}$ vs. m.

18. The method of claim 16, wherein the expected initial resistance value, $R_{TMRoUse}$, is determined by performing calculations on measurements for a plurality of TMR sensors, the calculations performed on the measurements for the plurality of TMR sensors comprising:

measuring a resistance, $R_{TMR}$, for each of the plurality of TMR sensors;

excluding TMR sensors whose $R_{TMR}$ values are determined to be outliers compared to other TMR sensors on a common substrate using a nearest neighbor method which excludes parts based on the maximum deviation from the two nearest neighbors;

for the nonexcluded TMR sensors, iteratively performing a process comprising the nearest neighbor method using only the two nearest neighbors which were not excluded on the previous pass until labeling of excluded TMR sensors remains about constant for at least two consecutive iterations, wherein the nonexcluded TMR sensors are labeled as good, wherein the excluded TMR sensors are labeled as bad; and determining the expected initial resistance value, $R_{TMRoUse}$, based on the median value of the two nearest neighbors which are labeled as good.

* * * * *